(12) United States Patent
Kolb

(10) Patent No.: US 10,782,072 B2
(45) Date of Patent: Sep. 22, 2020

(54) COUNTERFLOW HELICAL HEAT EXCHANGER

(71) Applicant: Enterex America LLC, Westbrook, CT (US)

(72) Inventor: James Kolb, Westbrook, CT (US)

(73) Assignee: ENTEREX AMERICA LLC, Westbrook, CT (US)

( * ) Notice: Subject to any disclaimer, the term of this patent is extended or adjusted under 35 U.S.C. 154(b) by 156 days.

(21) Appl. No.: 16/116,291

(22) Filed: Aug. 29, 2018

(65) Prior Publication Data

US 2019/0011190 A1 Jan. 10, 2019

Related U.S. Application Data

(63) Continuation of application No. 16/116,014, filed on Aug. 29, 2018, which is a continuation-in-part of
(Continued)

(51) Int. Cl.
*F28D 7/02* (2006.01)
*F28F 13/12* (2006.01)
(Continued)

(52) U.S. Cl.
CPC ........... *F28D 7/022* (2013.01); *F28D 7/0066* (2013.01); *F28F 1/022* (2013.01); *F28F 9/0202* (2013.01);
(Continued)

(58) Field of Classification Search
CPC ........ F28D 7/022; F28D 7/0066; F28D 7/026; F28F 9/0202; F28F 2009/0287; F28F 1/022; F28F 13/12; F28F 1/36
See application file for complete search history.

(56) References Cited

U.S. PATENT DOCUMENTS 1,833,876 A * 11/1931 McGrath ................. F28D 7/026
165/143
2,456,775 A * 12/1948 Fausek .................... F28D 7/022
165/141
(Continued)

FOREIGN PATENT DOCUMENTS

DE 102010007249 A1 * 8/2011 ............. F28D 7/022
EP 0224838 A1 6/1987
(Continued)

OTHER PUBLICATIONS

Lauterbach Verfahrentechnik GmbH, "Twisted strips inside the tube (TWIS)" Software for thermal and hydraulic design of heat exchangers http://wvwv.lv.soft.cam/software/fachbereiche/waermeuebertrager/index.htm.
(Continued)

*Primary Examiner* — Jon T. Schermerhorn, Jr.
(74) *Attorney, Agent, or Firm* — DeLio Peterson & Curcio LLC; David R. Pegnataro

(57) ABSTRACT

A helical heat exchanger assembly comprises a plurality of helical heat exchangers, each helical heat exchanger comprising a tube having first and second ends, a length, an inner diameter and a cross-section incorporating the inner diameter, a thermally conductive tube insert having a length and an outer diameter substantially equal to the inner diameter of the tube, the tube insert having first and second ends and comprising a single helix extending along the length of the tube insert and twisted around a central axis. The tube insert is sealed within the tube by sealing an outer edge of the helix to an inner surface of the tube to form fluid-tight first and second fluid flow paths defined between opposing sides of the helix and the inner surface of the tube, respectively. A plurality of inlet and outlet fluid ports are positioned for passage of a first and second fluid into and out of each tube. A first manifold connects each of the first ends of the heat (Continued)

exchanger tubes and a second manifold connects each of the second ends of the heat exchanger tubes, wherein at least one of the first or second manifolds includes baffles to direct fluid flow within the manifold such that at least some of the helical heat exchangers may be arranged in series, or in parallel, within the heat exchanger assembly via the baffles. Each helix has a predetermined pitch which may be less than or greater than the tube inner diameter and defines a length of the first and second fluid flow paths within each heat exchanger tube, wherein the pitch of the helix may be constant or variable along the length of the tube insert.

26 Claims, 14 Drawing Sheets

Related U.S. Application Data application No. 14/674,699, filed on Mar. 31, 2015, now abandoned.

(60) Provisional application No. 61/980,274, filed on Apr. 16, 2014.

(51) Int. Cl.
 F28D 7/00 (2006.01)
 F28F 9/02 (2006.01)
 F28F 1/02 (2006.01)
 F28F 1/36 (2006.01)
 B23P 15/26 (2006.01)

(52) U.S. Cl.
 CPC .............. *F28F 13/12* (2013.01); *B23P 15/26* (2013.01); *F28D 7/026* (2013.01); *F28F 1/36* (2013.01); *F28F 2009/0287* (2013.01); *F28F 2230/00* (2013.01); *F28F 2275/04* (2013.01); *F28F 2275/122* (2013.01)

(56) References Cited

U.S. PATENT DOCUMENTS

| | | | | |
|---|---|---|---|---|
| 2,471,317 | A * | 5/1949 | Fausek | F28D 7/022 165/141 |
| 2,775,683 | A * | 12/1956 | Kleist | F25B 43/00 392/398 |
| 2,915,292 | A * | 12/1959 | Gross | F28D 7/026 165/89 |
| 3,468,371 | A * | 9/1969 | Menze | B21D 53/02 165/156 |
| 3,470,949 | A | 10/1969 | Bouthors et al. | |
| 3,636,982 | A * | 1/1972 | Drake | F28F 1/40 138/38 |
| 3,739,842 | A | 6/1973 | Whalen | |
| 3,907,028 | A * | 9/1975 | Lawson | F28D 7/022 165/156 |
| 4,480,172 | A * | 10/1984 | Ciciliot | F22B 1/288 165/140 |
| 4,753,833 | A | 6/1988 | Fishgal et al. | |
| 5,005,542 | A | 4/1991 | Rissanen | |
| 5,046,548 | A | 9/1991 | Tilly | |
| 5,233,970 | A | 8/1993 | Harris | |
| 5,307,867 | A | 5/1994 | Yasuda et al. | |
| 5,409,057 | A * | 4/1995 | Zifferer | B21C 37/151 165/156 |
| 5,413,088 | A | 5/1995 | Oviatt | |
| 5,573,061 | A * | 11/1996 | Chiba | F28F 9/0202 165/176 |
| 6,044,837 | A | 4/2000 | Tyler | |
| 6,481,492 | B1 * | 11/2002 | Zhu | C10G 9/20 122/235.17 |
| 7,597,136 | B2 * | 10/2009 | Kite | F28D 7/024 165/154 |
| 7,756,404 | B2 * | 7/2010 | Schubert | F28D 7/026 392/478 |
| 8,069,678 | B1 * | 12/2011 | Bernert | F28F 9/0282 62/50.2 |
| 8,418,484 | B2 | 4/2013 | Petrenko et al. | |
| 9,581,394 | B2 * | 2/2017 | Jensen | F28F 1/12 |
| 9,719,733 | B2 * | 8/2017 | Yang | F28F 1/003 |
| 10,119,769 | B2 * | 11/2018 | Yang | F28F 1/003 |
| 2006/0124285 | A1 * | 6/2006 | Kite | F28F 1/06 165/163 |
| 2010/0018246 | A1 * | 1/2010 | Wolfe, IV | F28F 13/06 62/513 |
| 2011/0197444 | A1 | 8/2011 | Kim | |
| 2011/0240266 | A1 * | 10/2011 | Holland | F28F 1/30 165/109.1 |
| 2013/0041066 | A1 | 3/2013 | Chlup | |
| 2014/0298653 | A1 | 10/2014 | Nordlien et al. | |
| 2015/0300745 | A1 * | 10/2015 | Kolb | F28F 9/0202 165/156 |
| 2017/0108279 | A1 * | 4/2017 | Webb | B23P 15/26 |
| 2018/0100704 | A1 * | 4/2018 | Lewandowski | F28F 27/02 |

FOREIGN PATENT DOCUMENTS

| | | | | |
|---|---|---|---|---|
| EP | 3246651 | A1 * | 11/2017 | ............... F28C 3/00 |
| GB | 0326278 | | 3/1930 | |
| GB | 584308 | A | 1/1947 | |
| WO | 199530870 | A1 | 11/1995 | |
| WO | 2004063655 | A1 | 7/2004 | |

OTHER PUBLICATIONS

Zamankhan, Piroz, "Heat Transfer in Counterflow Heat Exchangers with Helical Turbulators" (Abstract). Communications in Nonlinear Science and Numerical Simulation, vol. 15, Issue 10, Oct. 2010 pp. 2894-2907, http://www.sciencedirect.com/science/article/pii/S1007570409005620.

Internet information from Calgavin describing helical twisted tape inserts, http://www.calgavin.com/heat-exchanger-solutions/twisted-tape/#.

Internet information from Tranter about spiral heat exchangers, http://tranter.com/Pages/products/spiral/description-benefits.aspx?gclid=COmig9_vv70CFU..

Internet information from Shanghai Huanqiu Refrigeration Equipment, Heat Exchanger With Helical Baffles, http://en.shhq.cc/InfoContent/&id=91cle299-9f79-46e7-a4a1-7440f54f0947.html.

Internet information from CBI Technologies, "HELIXCHANGER Heat Exchanger", http://www.cbi.com/technologies/helixchanger-heat-exchanger.

\* cited by examiner

COUNTERFLOW HELICAL HEAT EXCHANGER

BACKGROUND OF THE INVENTION

1. Field of the Invention

The present invention relates to heat exchangers and, more particularly, to liquid-to-liquid heat exchangers for use in comparatively smaller spaces, such as in automobiles or other motor vehicles.

2. Description of Related Art

Designers of heat exchangers for use in automobiles and other motor vehicles are constantly striving to obtain increased heat transfer capability in a smaller space. In the field of liquid-to-liquid heat exchangers, the use of turbulators on the hot fluid side and extended surface, such as a sintered metal matrix, on the cool fluid side, are well-known approaches to the problem. Increasing the flow path length of the fluids while maintaining reasonable fluid pressure drops is another approach to increased heat transfer, but it is not usually possible to accomplish this in a smaller space.

Therefore, a need exists for an improved heat exchanger with superior heat transfer capabilities, which would provide for optimum performance at the least possible cost while utilizing standard liquid-to-liquid heat exchanger manufacturing techniques, and providing the same in an equivalent- or smaller-sized package.

SUMMARY OF THE INVENTION

Bearing in mind the problems and deficiencies of the prior art, it is therefore an object of the present invention to provide an improved heat exchanger assembly which can provide equivalent or superior heat transfer performance in a smaller package.

It is another object of the present invention to provide an improved heat exchanger which provides a considerable increase in flow path length, and consequently an increase in heat transfer, for a given tube length.

A further object of the invention is to provide an improved heat exchanger which allows for counterflow operation, providing optimum heat transfer performance.

It is yet another object of the present invention to provide an improved heat exchanger which makes use of standard aluminum liquid-to-liquid heat exchanger manufacturing techniques, such as cab (controlled atmosphere brazing) furnace flux brazing.

It is still another object of the present invention to provide an improved heat exchanger which includes a helical tube insert, thereby creating two fluid-tight fluid flow paths, each with considerably increased length, within the tube.

Still other objects and advantages of the invention will in part be obvious and will in part be apparent from the specification.

The above and other objects, which will be apparent to those skilled in the art, are achieved in the present invention which is directed to a helical heat exchanger assembly comprising a tube having first and second ends, a length, an inner diameter and a cross-section incorporating the inner diameter, and a thermally conductive tube insert having a length and an outer diameter substantially equal to the inner diameter of the tube, the tube insert having first and second ends and comprising a single helix extending along the length of the tube insert and twisted around a central axis. The helix has an outer edge contacting an inner surface of the tube and adapted to create a fluid tight seal and the tube insert is sealed within the tube by sealing the outer edge of the helix to the inner surface of the tube to form fluid-tight first and second fluid flow paths defined between opposing sides of the helix and the inner surface of the tube, respectively. A plurality of inlet and outlet fluid ports are positioned for passage of a first and second fluid into and out of the tube. The helix has a predetermined pitch which may be less than or greater than the tube inner diameter and defines a length of the first and second fluid flow paths, wherein the pitch of the helix may be constant or variable along the length of the tube insert.

The helix first and second ends sealingly contact inner surfaces of the first and second tube ends, respectively, such that the first fluid flow path is defined between a first side of the helix and the inner surface of the tube, and the second fluid flow path is defined between a second side of the helix and the inner surface of the tube. In an embodiment, the helix may include turbulating dimples or ridges on at least one side of the helix for promoting transfer of heat from a heated first fluid to a second cooled fluid through the helix during operation of the heat exchanger.

The fluid ports may be arranged for counterflow operation whereby the first and second fluids flow in opposite directions, such as positioning the inlet and outlet fluid ports in a set of fluid ports on opposing ends of the tube. In an embodiment, the assembly includes a first end cap sealed to the tube and tube insert first ends and a second end cap sealed to the tube and tube insert second ends, wherein the first and second end caps may be flat, circular plates sealed flush with the ends of the tube and tube insert to prevent fluid mixing inside the heat exchanger.

The tube and tube insert may be comprised of braze-clad aluminum and may be brazed together to create fluid-tight first and second fluid flow paths. Mechanically swaging or compressing the tube onto the outer edge of the helix prior to brazing acts to improve the seal between the outer edge of the helix to the inner surface of the tube.

In another aspect, the present invention is directed to a method of assembling a heat exchanger, comprising the steps of providing a tube having first and second ends, a length, an inner diameter and a cross-section incorporating the inner diameter; providing a thermally conductive tube insert having a length and an outer diameter substantially equal to the inner diameter of the tube, the tube insert having first and second ends and comprising a single helix extending along the length of the tube insert and twisted around a central axis, the helix having an outer edge adapted to contact an inner surface of the tube to create a fluid tight seal when the tube insert is inserted therein; and inserting the tube insert within the tube, such as by automation, and sealing the tube insert therein by sealing the outer edge of the helix to the inner surface of the tube to form fluid-tight first and second fluid flow paths defined between opposing sides of the helix and the inner surface of the tube, respectively. The method further comprises providing a plurality of inlet and outlet fluid ports for passage of a first and second fluid into and out of the tube. The fluid ports may be arranged for counterflow operation whereby the first and second fluids flow in opposite directions.

The helix has a predetermined pitch which may be less than or greater than the tube inner diameter and defines a length of the first and second fluid flow paths. In one embodiment, the pitch of the helix is constant along the length of the tube insert, and in another embodiment, the method further includes the step of varying the pitch of the helix along the length of the tube insert, wherein decreasing the pitch along at least a portion of the length of the tube insert increases the length of the first and second fluid flow paths within the helical heat exchanger, and increasing the pitch along at least a portion of the length of the tube insert increases the flow path area of the first and second fluids within the helical heat exchanger.

In an embodiment, the step of inserting the tube insert within the tube and sealing the tube insert therein may further comprise sealing the first and second ends of the tube insert to inner surfaces of the first and second tube ends, respectively, such that the first fluid flow path is defined between a first side of the helix and the inner surface of the tube, and the second fluid flow path is defined between a second side of the helix and the inner surface of the tube.

The tube and tube insert may be comprised of braze-clad aluminum, and the method may further include brazing the heat exchanger in a controlled atmosphere brazing furnace to create fluid-tight first and second fluid flow paths. In an embodiment, the method may further include mechanically swaging or compressing the tube onto the outer edge of the helix prior to brazing the heat exchanger.

The method may further comprise the steps of sealing a second end cap to the tube and tube insert second ends, and sealing a first end cap to the tube and tube insert first ends. In an embodiment, the first and second end caps are flat, circular plates and are sealed flush with the ends of the tube and tube insert to prevent fluid mixing inside the heat exchanger.

In still another aspect, the present invention is directed to a method of operating a heat exchanger assembly, comprising providing a heat exchanger having a tube with first and second ends, a length, an inner diameter and a cross-section incorporating the inner diameter; providing a thermally conductive tube insert having a length and an outer diameter substantially equal to the inner diameter of the tube, the tube insert comprising a single helix extending along the length of the tube insert and twisted around a central axis, the tube insert sealed within the tube to form fluid-tight first and second fluid flow paths defined between opposing sides of the helix and the inner surface of the tube, respectively; and providing a plurality of inlet and outlet fluid ports for passage of a first and second fluid into and out of the tube. The method further comprises connecting inlet and outlet fluid lines for a first fluid to a first set of inlet and outlet ports; connecting inlet and outlet fluid lines for a second fluid to a second set of inlet and outlet ports; and flowing the first and second fluids through the first and second sets of inlet and outlet ports, respectively, to transfer heat from one fluid to the other. The first and second sets of inlet and outlet fluid ports may be arranged for counterflow operation whereby the first and second fluids flow in opposite directions through the first and second fluid flow paths.

In still yet another aspect, the present invention is directed to a heat exchanger assembly comprising a plurality of helical heat exchangers, each helical heat exchanger comprising: a tube having first and second ends, a length, an inner diameter and a cross-section incorporating the inner diameter; a thermally conductive tube insert having a length and an outer diameter substantially equal to the inner diameter of the tube, the tube insert having first and second ends and comprising a single helix extending along the length of the tube insert and twisted around a central axis, wherein the tube insert is sealed within the tube by sealing an outer edge of the helix to an inner surface of the tube to form fluid-tight first and second fluid flow paths defined between opposing sides of the helix and the inner surface of the tube; and a plurality of inlet and outlet fluid ports for passage of a first and second fluid into and out of the tube. The assembly further comprises a first manifold connecting each of the first ends of the helical heat exchanger tubes, the first manifold including a fluid inlet port for passage of the first fluid into the heat exchanger assembly, and a second manifold connecting each of the second ends of the helical heat exchanger tubes, the second manifold including a fluid inlet port for passage of the second fluid into the heat exchanger assembly, wherein the first and second manifolds are each sealed to prevent fluid mixing inside the heat exchanger assembly. At least one of the first or second manifolds may include baffles to direct fluid flow within the manifold and the configuration of the baffles determines whether two or more of the helical heat exchangers within the assembly are arranged in series, in parallel, or some combination thereof.

The first manifold may further comprise a fluid outlet port for passage of the second fluid out of the heat exchanger assembly and the second manifold may comprise a fluid outlet port for passage of the first fluid out of the heat exchanger assembly, wherein the first and second manifold inlet and outlet fluid ports are arranged for counterflow operation.

The first and second ends of each helix sealingly contact inner surfaces of the first and second tube ends, respectively, such that the first fluid flow path is defined between a first side of the helix and the inner surface of the tube, and the second fluid flow path is defined between a second side of the helix and the inner surface of the tube. Each helix has a predetermined pitch defining a length of the first and second fluid flow paths within each helical heat exchanger, and the pitch of each helix may be constant along the length of the respective tube insert, or alternatively, the pitch of at least one of the helices may not be constant along the length of at least one tube insert.

Each pair of tube and tube insert may be comprised of braze-clad aluminum and may be brazed together to create fluid-tight first and second fluid flow paths within the tube. In an embodiment, each tube may be mechanically swaged or compressed onto the outer edge of each helix prior to brazing.

In another aspect, the present invention is directed to a method of assembling a heat exchanger, comprising providing a plurality of helical heat exchangers, each helical heat exchanger comprising: a tube having first and second ends, a length, an inner diameter and a cross-section incorporating the inner diameter; a thermally conductive tube insert having a length and an outer diameter substantially equal to the inner diameter of the tube, the tube insert having first and second ends and comprising a single helix extending along the length of the tube insert and twisted around a central axis, wherein the tube insert is sealed within the tube by sealing an outer edge of the helix to an inner surface of the tube to form fluid-tight first and second fluid flow paths defined between opposing sides of the helix and the inner surface of the tube; and a plurality of inlet and outlet fluid ports for passage of a first and second fluid into and out of the tube. The method further comprises providing first and second manifolds for attachment to opposing ends of the plurality of heat exchangers, at least one of the first or second manifolds comprising baffles to direct fluid flow within the manifold; connecting each of the first ends of the helical heat exchanger tubes to the first manifold, the first manifold including a fluid inlet port for passage of the first fluid into the heat exchanger assembly; connecting each of the second ends of the helical heat exchanger tubes to the second manifold, the second manifold including a fluid inlet port for passage of the second fluid into heat exchanger assembly; and sealing the first and second manifolds to the first and second ends of the heat exchanger tubes, respectively, to prevent fluid mixing inside the heat exchanger assembly. The first manifold may further comprise a fluid outlet port for passage of the second fluid out of the heat exchanger assembly and the second manifold may further comprise a fluid outlet port for passage of the first fluid out of the heat exchanger assembly, wherein the first and second manifold inlet and outlet fluid ports are arranged for counterflow operation.

The step of sealing each tube insert within the tube to form the helical heat exchanger may comprise sealing the first and second ends of the tube insert to inner surfaces of the first and second tube ends, respectively, such that the first fluid flow path is defined between a first side of the helix and the inner surface of the tube, and the second fluid flow path is defined between a second side of the helix and the inner surface of the tube. Each pair of tube and tube insert may be comprised of braze-clad aluminum, and the method may further include the step of brazing each helical heat exchanger in a controlled atmosphere brazing furnace to create fluid-tight first and second fluid flow paths within each tube. Prior to brazing the heat exchanger, the method may include mechanically swaging or compressing each tube onto the outer edge of each respective helix.

Prior to connecting opposing ends of the plurality of heat exchangers to each of the first and second manifolds, respectively, the method may include arranging at least two of the plurality of helical heat exchangers in parallel, or alternatively, in series, via the baffles in one or both of the first and second manifolds.

Each helix has a predetermined pitch defining a length of the first and second fluid flow paths within each helical heat exchanger, and the pitch of each helix may be constant along the length of each tube insert, or alternatively, the method may further include the step of varying the pitch of at least one helix along the length of the tube insert, wherein decreasing the pitch along at least a portion of the length of the tube insert increases the length of the first and second fluid flow paths within the helical heat exchanger, and wherein increasing the pitch along at least a portion of the length of the tube insert increases the flow path area of the first and second fluids within the helical heat exchanger.

In still another aspect, the present invention is directed to a method of operating a heat exchanger, comprising providing a plurality of helical heat exchangers, each helical heat exchanger comprising: a tube having first and second ends, a length, an inner diameter and a cross-section incorporating the inner diameter; a thermally conductive tube insert having a length and an outer diameter substantially equal to the inner diameter of the tube, the tube insert having first and second ends and comprising a single helix extending along the length of the tube insert and twisted around a central axis, wherein the tube insert sealed within the tube by sealing an outer edge of the helix to an inner surface of the tube to form fluid-tight first and second fluid flow paths defined between opposing sides of the helix and the inner surface of the tube; and a plurality of inlet and outlet fluid ports for passage of a first and second fluid into and out of the tube. The method further comprises providing first and second manifolds for attachment to opposing ends of the plurality of heat exchangers, at least one of the first or second manifolds comprising baffles to direct fluid flow within the manifold; connecting each of the first ends of the helical heat exchanger tubes to the first manifold, the first manifold including a fluid inlet port for passage of the first fluid into the heat exchanger assembly and a fluid outlet port for passage of the second fluid out of the heat exchanger assembly; connecting each of the second ends of the helical heat exchanger tubes to the second manifold, the second manifold including a fluid inlet port for passage of the second fluid into heat exchanger assembly and a fluid outlet port for passage of the first fluid out of the heat exchanger assembly; sealing the first and second manifolds to the first and second ends of the heat exchanger tubes, respectively, to prevent fluid mixing inside the heat exchanger assembly; connecting inlet and outlet fluid lines for the first fluid to the first fluid inlet and outlet ports of the first and second manifolds, respectively; connecting inlet and outlet fluid lines for the second fluid to the second fluid inlet and outlet ports of first and second manifolds, respectively; and flowing the first and second fluids through the heat exchanger assembly to transfer heat from one fluid to the other. The first and second manifold inlet and outlet fluid ports may be arranged for counterflow operation.

Prior to connecting opposing ends of the plurality of heat exchangers to each of the first and second manifolds, respectively, the method may include arranging at least two of the plurality of helical heat exchangers in parallel, or alternatively, in series, via the baffles in one or both of the first and second manifolds.

Each helix has a predetermined pitch defining a length of the first and second fluid flow paths within each helical heat exchanger, and the pitch of each helix may be constant along the length of each tube insert, or alternatively, the method may further include the step of varying the pitch of at least one helix along the length of the tube insert, wherein decreasing the pitch along at least a portion of the length of the tube insert increases the length of the first and second fluid flow paths within the helical heat exchanger, and wherein increasing the pitch along at least a portion of the length of the tube insert increases the flow path area of the first and second fluids within the helical heat exchanger.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE EMBODIMENT(S)

Figure 1:
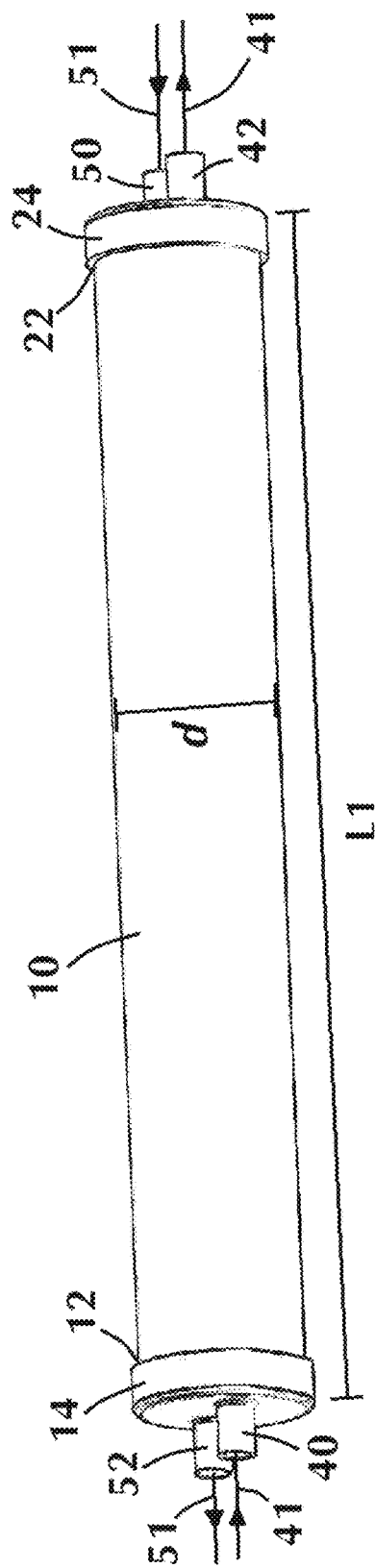
FIG. 1 depicts a perspective view of one embodiment of a heat exchanger with helical tube insert according to the present invention.

In describing the embodiments of the present invention, reference will be made herein to FIGS. 1-15 of the drawings in which like numerals refer to like features of the invention.

The present invention is directed to a heat exchanger assembly including a heat exchanger tube and a helical tube insert comprising a single helix. The helical tube insert is sealed within a tube of substantially similar cross-section, thereby creating two distinct fluid flow paths within the tube. The pitch of the helical convolutions is less than or equal to the inner diameter of the tube, in order to obtain fluid flow paths of increased length over that of a conventional liquid-to-liquid heat exchanger tube. The ends of the heat exchanger tube are capped and the tube is fitted with inlet and outlet fluid ports for each of the two fluid flow paths. The flow paths within the heat exchanger assembly of the present invention may be parallel flow, or co-current, (where the fluids move in the same direction), or counterflow (where the direction of the flow of one working fluid is opposite the direction of the flow of the other fluid.) In parallel flow heat exchangers, the outlet temperature of the "hot" fluid can never become lower than the outlet temperature of the "cold" fluid, and the exchanger is performing at its best when the outlet temperatures are equal.

Counterflow heat exchangers are inherently more efficient than parallel flow heat exchangers and have several significant advantages over a parallel flow design. The more uniform temperature difference between the two fluids minimizes the thermal stresses throughout the heat exchanger, the outlet temperature of the "hot" fluid can become considerably lower than the outlet temperature of the "cold" fluid and can actually approach the inlet temperature of the "cold" fluid, and the more uniform temperature difference produces a more uniform rate of heat transfer throughout the heat exchanger, over the entire length of the fluid flow path. The fluid connection fittings of the present invention may be arranged for counterflow operation for optimum heat transfer performance.

Certain terminology is used herein for convenience only and is not to be taken as a limitation of the invention. For example, words such as "upper," "lower," "left," "right," "horizontal," "vertical," "upward," "downward," "clockwise," and "counterclockwise" merely describe the configuration shown in the drawings. For purposes of clarity, the same reference numbers may be used in the drawings to identify similar elements.

Additionally, in the subject description, the word "exemplary" is used to mean serving as an example, instance or illustration. Any aspect or design described herein as "exemplary" is not necessarily intended to be construed as preferred or advantageous over other aspects or design. Rather, the use of the word "exemplary" is merely intended to present concepts in a concrete fashion.

Referring now to FIG. 1, a perspective view of one embodiment of the helical heat exchanger assembly of the present invention is shown. The assembly includes a tube 10 of substantially circular cross-section, having a length L1 and first and second ends 12, 22, and a helical tube insert (not shown) sealed therein. Tubes having a circular-shaped axial cross-section (i.e. perpendicular to the axis of the tube) are typically utilized for optimum heat transfer performance of the heat exchanger, although other tube shapes and cross-sections may also be utilized to achieve the objects of the present invention. The ends of the tube 10 may be sealed by a first end cap 14 and second end cap 24 to form a self-contained heat exchanger assembly unit. Preferably, the end caps 14, 24 are flat, circular plates which are sealed flush with the ends of the tube and helical tube insert to prevent fluid mixing at the interior ends of the heat exchanger assembly. The first and second end caps 14, 24 may be secured and sealed to the respective ends of the tube and helical insert by welding, solder baking, brazing or other equivalent process known to those in the art.

The helical tube insert, and optionally, the tube, are each made of thermally conductive metal, such as aluminum or copper alloys. All parts of the heat exchanger may be made of an aluminum alloy clad with a brazing alloy, and the unit may be flux brazed in a cab (controlled atmosphere brazing) furnace, as per standard aluminum liquid-to-liquid heat exchanger manufacturing techniques. Brazing of the entire unit ensures that the edges of the helix, which are in a tight fit against the inner surface of the tube as will be described below, become sealed thereto, and that the ends of the helix are sealed to the respective end caps, such that two distinct fluid-tight fluid flow paths are created and no common fluid is allowed to flow on both sides of the helix in the same direction, ensuring optimal heat transfer.

Tube 10 includes a plurality of inlet and outlet fluid ports for passage of fluid into and out of the heat exchanger assembly. As shown in FIG. 1, the heat exchanger assembly of the present invention includes a first fluid inlet port 40 and outlet port 42, and a second fluid inlet port 50 and outlet port 52. The first fluid flow path is depicted in direction 41, and the second fluid flow path is depicted in direction 51. In operation of the heat exchanger, inlet and outlet fluid lines (not shown) for first fluid flow path 41 are connected to inlet and outlet ports 40 and 42, respectively, and inlet and outlet fluid lines (not shown) for second fluid flow path 51 are connected to inlet and outlet ports 50 and 52, respectively. A first fluid then enters flow path 41 and a second fluid then enters flow path 51 through the respective sets of inlet and outlet ports, and through the respective fluid flow paths respectively, in counterflow operation. As shown in FIG. 1, the fluid connection fittings are positioned per design requirements, and may be positioned, for example, on either ends of the tube, so long as the fittings are arranged for counterflow operation.

Figure 2:
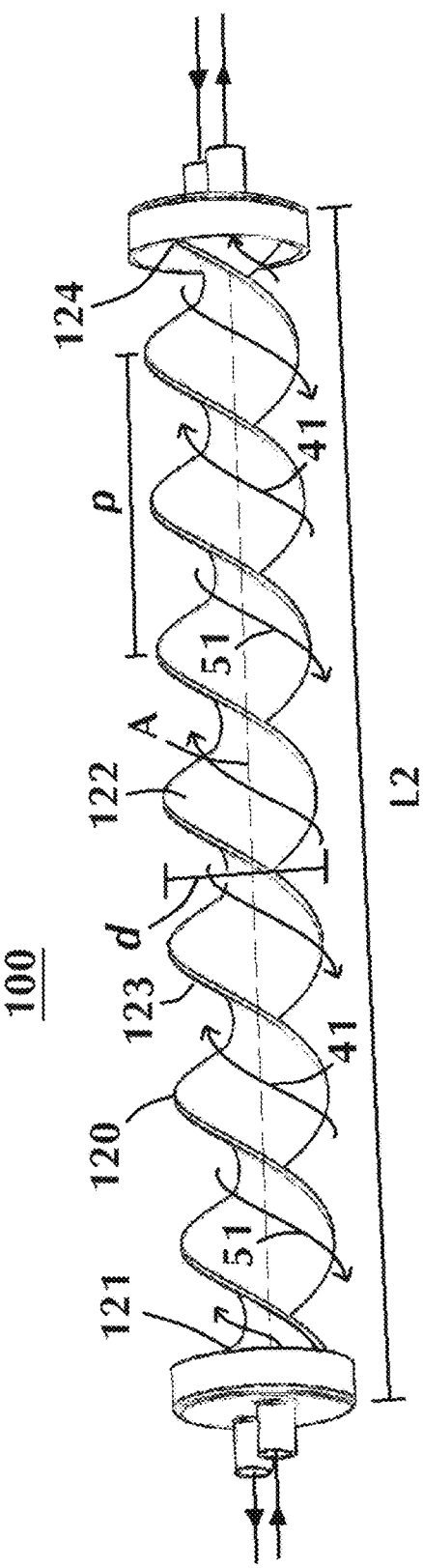
FIG. 2 depicts a perspective view of the heat exchanger with helical tube insert, as shown in FIG. 1, with the heat exchanger outer tube or shell removed to show a helical tube insert having a constant pitch along the length of the tube insert.
Figure 5:
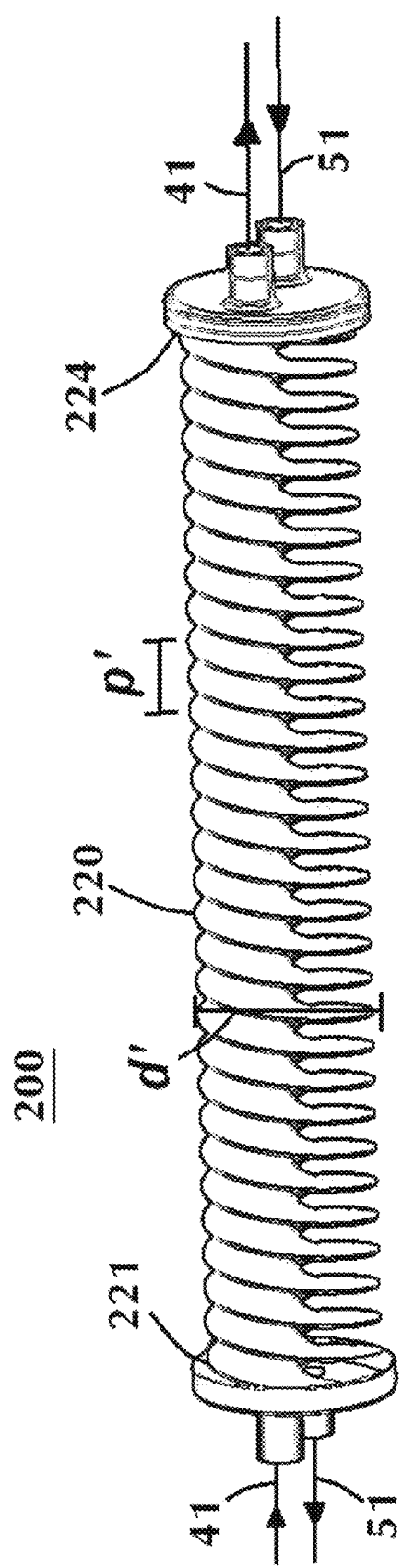
FIG. 5 depicts a perspective view of another embodiment of a heat exchanger with helical tube insert according to the present invention, wherein the helix of the tube insert has a constant pitch along the length of the tube insert, but the helix is more tightly twisted to produce longer fluid flow paths as compared to FIG. 2.

Referring now to FIG. 2, the outer tube or shell has been removed to show one embodiment of helical tube insert 100. Tube insert 100 has a length L2 and a substantially circular outer diameter which is approximately equal to the inner diameter of tube 10, and is comprised of a single helix 120 extending along the length L2 of tube insert 100 and twisted around a phantom central axis A. As shown in FIGS. 1-2, in a normal configuration, helix first end 121 is adjacent tube first end 12, and helix second end 124 is adjacent tube second end 22. The first end 121 of the helix is sealingly contacting an inner surface of tube end cap 14 and the second end of the helix is sealingly contacting an inner surface of tube end cap 24. In the embodiment shown in FIG. 2, the pitch p of the helical convolutions of the helix 120 is constant along the length of the insert 100 and is greater than the inner diameter d of the heat exchanger tube 10, thereby creating two fluid flow paths, each with increased length over that of a typical heat exchanger tube. Alternatively, the pitch p of the helical convolutions may be less than or equal to the inner diameter of the heat exchanger tube, as shown in FIG. 5. Such a configuration will result in an even longer fluid flow path than if the pitch p were greater than the inner diameter of the tube. As used herein, the pitch of a helical convolution is defined as the axial advance of a point during one complete rotation.

As further shown in FIG. 2, the helical tube insert 100 may have a substantially circular outer diameter which is nominally smaller than the inner diameter d of tube 10, to allow for a sliding fit therein. During assembly of the heat exchanger, tube insert 100 is slideably inserted into either of tube ends 12, 22 and in the direction of the opposing tube end. As shown in FIGS. 1-6, tube insert 100 does not extend substantially beyond the first and second tube ends 12, 22. After insertion, the outer edges of the helix 120 are sealed to the inner surface 11 of tube 10, such as by brazing, to create fluid-tight fluid flow paths 41, 51. Any suitable sealing material may be employed between the edge of the helix and tube 10. In one or more embodiments, tube 10 may be mechanically swaged, or compressed, onto the outer edges of helix 120 prior to brazing, which may act to form an improved seal. Tube insert 100 may be installed manually or by automation during assembly of the heat exchanger unit. After installation, end caps 14, 24 are sealed to tube ends 12, 22, and helix ends 121, 124, respectively, to form fluid-tight fluid flow paths 41, 51 inside the heat exchanger assembly.

Figure 3:
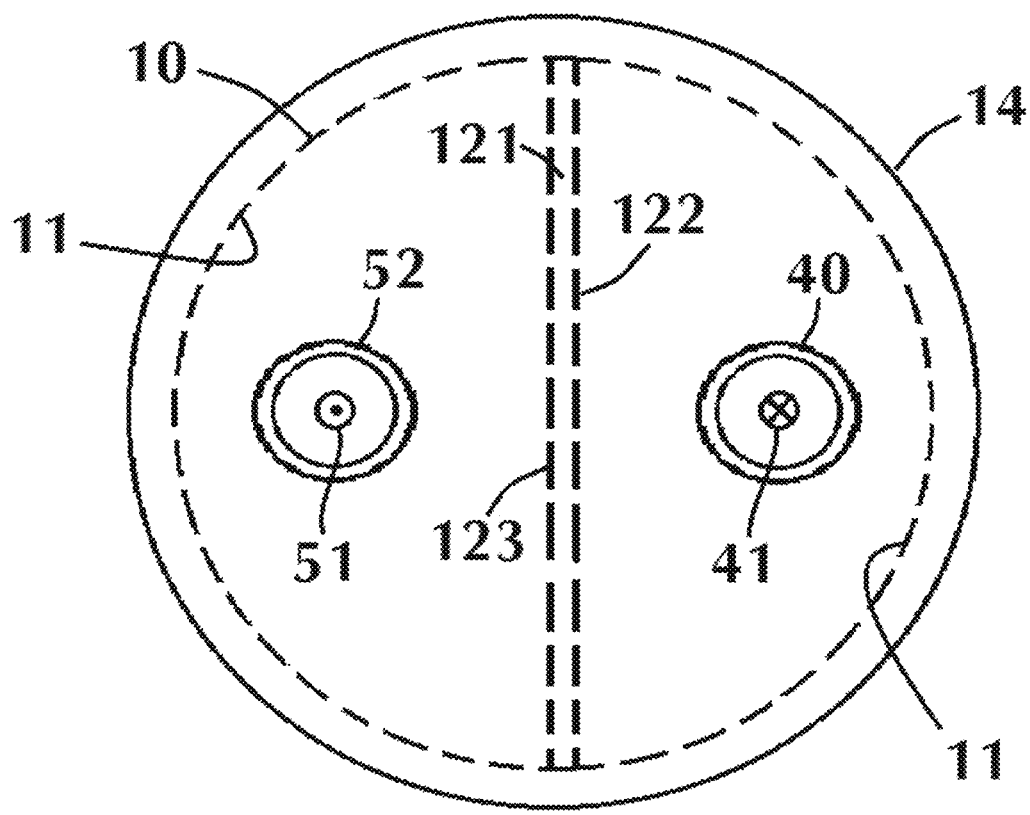
FIG. 3 depicts an end view of the heat exchanger with helical tube insert according to the present invention, as shown in FIGS. 1 and 2.

As shown in FIG. 2, and more particularly shown in FIG. 3, in an embodiment of the invention, the ends of helix 120 are oriented such that the helix is sealingly contacting the inner surface of respective end caps along a line intermediate adjacent fluid connection fittings to create two fluid-tight fluid flow paths which track the opposing sides of the helix during each helical convolution. FIG. 3 shows an end view of the embodiment of the heat exchanger shown in FIGS. 1-2, showing first fluid inlet port 40 and second fluid outlet port 52 disposed on and integral with end cap 14. Fluid connection fittings 40, 52 and 42, 50 (not shown) are arranged for counterflow operation. As shown in FIG. 3, helix first end 121 sealingly contacts an inner surface of end cap 14 intermediate first fluid inlet 40 and second fluid outlet 50, such that first fluid flow path 41 is fluid-tight between side 122 of the helix and the inner surface of tube 10, and second fluid flow path 51 is fluid-tight between side 123 of the helix and the inner surface of tube 10. The first and second fluids flow in opposite directions through the respective fluid paths between alternating convolutions of the helix to cool one of the fluids by transferring heat through the helix to the other fluid (FIGS. 2, 4).

Figure 4:
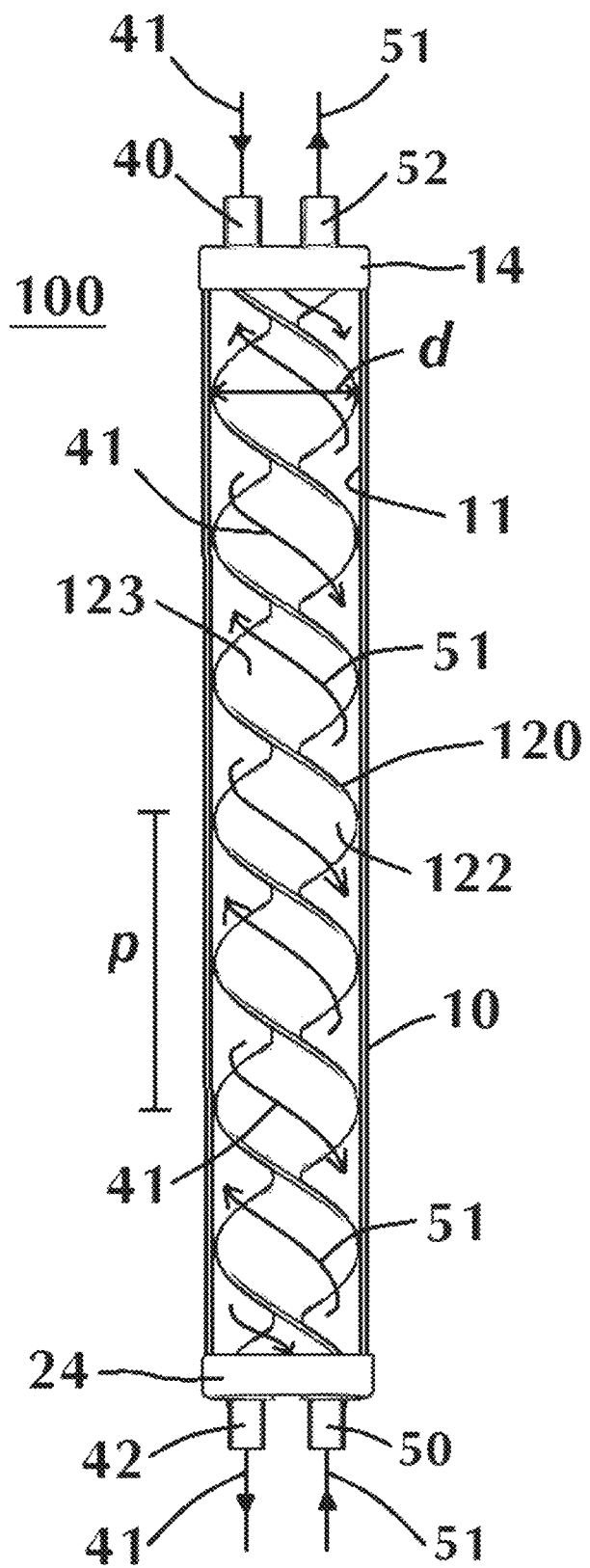
FIG. 4 depicts a top, cross-sectional view of the heat exchanger with helical tube insert according to the present invention, as shown in FIGS. 1 to 3.

FIG. 4 depicts a top cross-sectional view of the assembled heat exchanger with helical tube insert, as shown in FIGS. 1-3. As shown in FIG. 4, helix 120 has a first side 122 and an opposing second side 123. The respective sides of the helix are offset by a predetermined distance along the length of tube insert 100, creating two distinct fluid flow paths 41, 51 between the helical convolutions. First fluid flow path 41 begins at tube inlet 40 and ends at tube outlet 42, and is defined between side 122 of the helix and the inner surface 11 of the tube, while second fluid flow path 51 begins at tube inlet 50 and ends at tube outlet 52 and is defined between side 123 of the helix and the inner surface of the tube. As depicted in FIG. 4, the pitch p of the helical convolutions of helix 120 is constant along the length of the tube insert and is greater than the inner diameter d of the heat exchanger tube 10 and defines two fluid flow paths, each with increased length over that of a conventional heat exchanger tube.

An advantage of the helical tube insert of the present invention is that because the insert comprises a single helix, the heat exchanger assembly can uniquely take advantage of nano-conductor and superconductor materials available today by focusing on the conductive elements of heat transfer and optimizing convective resistance. The single helix provides for much greater flexibility in pitch and heat exchanger chamber/channel design over that of prior art heat exchangers, for example, the helix may be twisted per design requirements to be extremely tight and/or comprise a variable pitch over the length of the insert. Such twisting flexibility allows for an increase in heat transfer surface area while optimizing hydraulic diameter and flow characteristics with low flow resistance.

Prior art helical heat exchangers typically comprise at least two helices, which prevents the manufacture of a helical insert having a pitch as short as can be achieved in the present invention, and prevents the manufacture of a helical insert having a variable pitch over the length of the insert, as the multiple helices would interfere with each other. An example of a tighter twisting of the helix is depicted in FIG. 5, showing helical tube insert 200 comprising a helix 220 having an outer diameter d' and a pitch p' that is substantially shorter than the pitch p of helix 120. The outer diameter d' of insert 200 is nominally smaller than the inner diameter of the heat exchanger tube (not shown), to allow for a sliding fit therein. As shown in FIG. 5, the ratio of pitch p' to diameter d' of helix 220 may be about (p'/d'=0.38), whereas the ratio of pitch p to diameter d of helix 120 may be about (p/d=2). It should be understood by those skilled in the art that the pitch p' is not intended to represent the minimum pitch achievable by the present invention, and is being shown for exemplary purposes only. In general, the shorter the pitch, the longer the fluid flow path that can be achieved.

In another embodiment, the pitch of the helix (and therefore the offset distance between adjacent helical convolutions) may be varied over the length of the fluid flow path, which is more conducive to phase cooling, and is particularly applicable for utilization in vehicle battery cooling, for example. This is shown, for example, in FIG. 6 where the pitch p1 of the helix 320 near end 321 is longer than the pitch p2 at the opposing end 324 of the helix, and the pitch gradually decreases along the length of the tube insert beginning from end 321. Having a longer pitch p1 along a portion of the length of the helical insert at one end of the heat exchanger allows for increased flow path area of the first and second fluids in this section of the heat exchanger to account for volume changes of the respective fluids as the temperature changes during the heat exchange process. In that the pitch of the helix may be variable over the length of the fluid flow path, the present invention thus allows for more flexibility in spiral density for controlling fluid flow velocity and Reynold's Number, thereby increasing heat transfer performance over conventional heat exchangers. More specifically, primary heat transfer surface area can be added with little pressure drop as Reynold's Number is optimized through flexible chamber/channel design.

Figure 6:
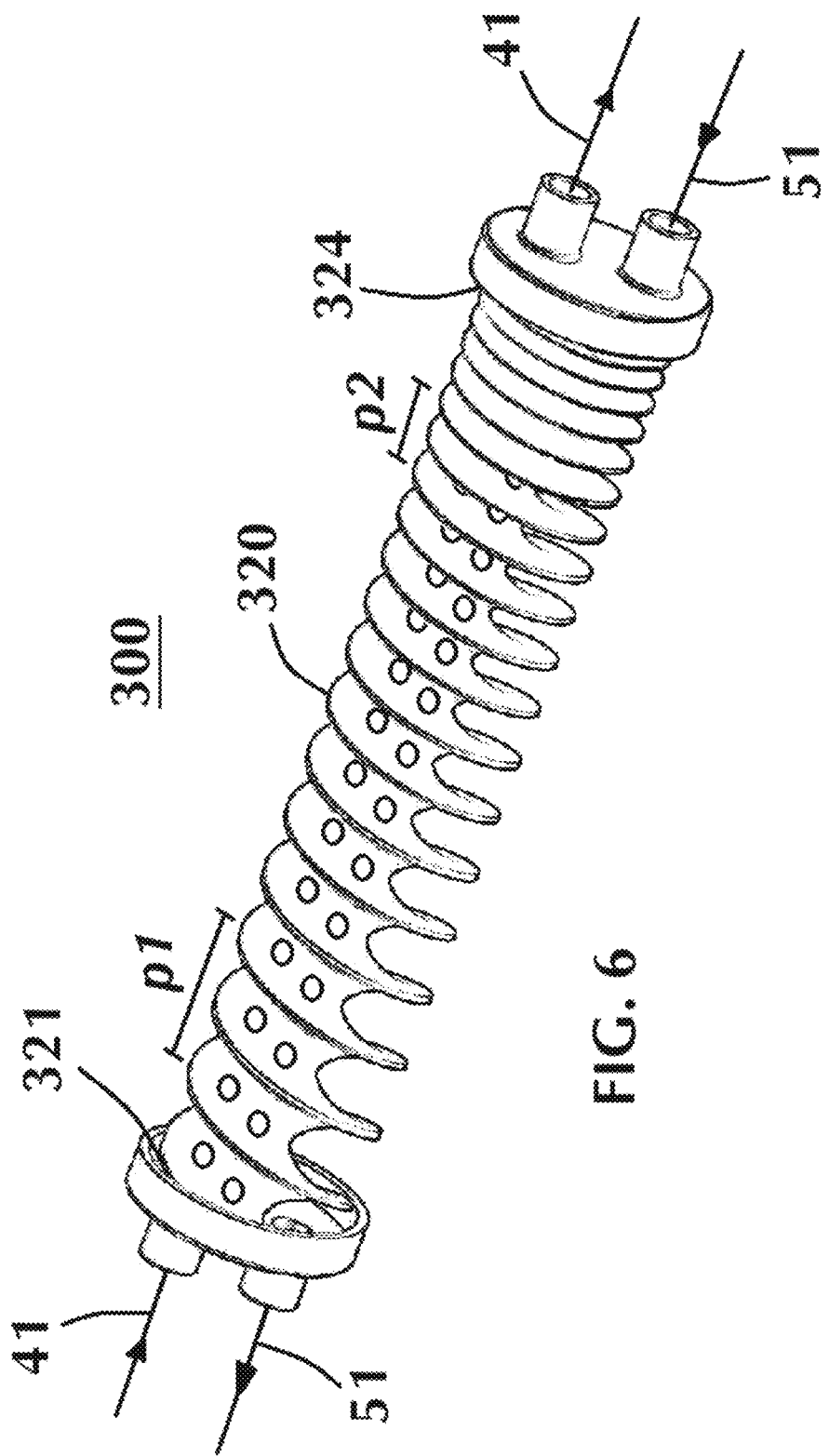
FIG. 6 depicts a perspective view of another embodiment of a helical tube insert according to the present invention, wherein the pitch of the helix is variable along the length of the tube insert.

In at least one embodiment of the present invention, projections such as turbulating dimples or ridges of various shapes may be incorporated by deformation or embossment of the helix to provide turbulation, as further shown in FIG. 6. FIG. 6 shows a tube insert 300 having turbulating dimples 340 having an oval shape within the fluid flow paths created by and defined between each side of helix 320 and the inner surface of the tube (not shown). The projections may have alternative shapes such as circular, triangular, or other geometrical shape. The projections or dimples 340 promote transfer of heat from a heated first fluid to a second cooled fluid through the helix during operation of the liquid-to-liquid heat exchanger of the present invention.

It should be understood that the present invention as described above has been described in its basic form of a heat exchanger assembly including one heat exchanger tube with a helical tube insert sealed therein. More than one heat exchanger tube with helical tube insert may be combined into a larger heat exchanger assembly, per design requirements, in accordance with the objects of the present invention.

In such a configuration, a plurality of helical heat exchanger tubes may be positioned, for example, such that the first and second fluid inlet ports of each helical heat exchanger are arranged in parallel, and the first and second fluid outlet ports of each helical heat exchanger are arranged in parallel. The assembly would include inlet and outlet tanks or manifolds connecting each of the first fluid inlet and outlet ports, respectively, and each of the second fluid inlet and outlet ports, respectively. Each tank or manifold would further include a fluid port for passage of a first or second fluid, respectively, into or out of the heat exchanger assembly. The inlet and outlet manifolds may each be sealed to prevent fluid mixing inside the heat exchanger assembly, and the first and second inlet and outlet manifold fluid ports may be arranged for counterflow operation whereby the first and second fluids flow in opposite directions. It should be understood by those skilled in the art that in other embodiments, the helical heat exchangers inside the enclosure could instead be connected in series, per design requirements, by baffling the ends of the tanks of the enclosure. Such a configuration would allow for an even longer fluid flow path.

Figure 7:
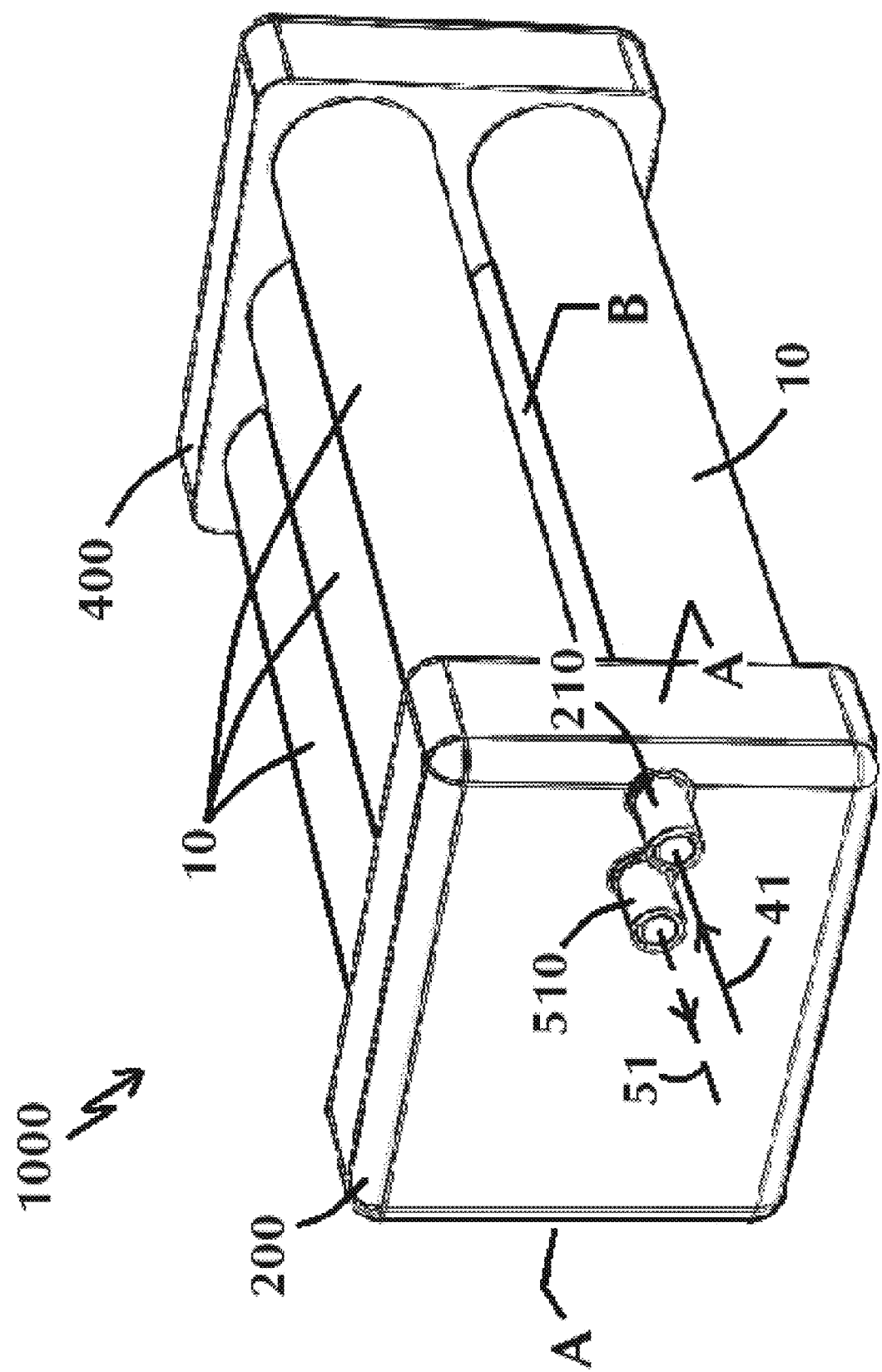
FIG. 7 depicts a perspective view of one embodiment of a heat exchanger assembly including three helical heat exchangers arranged in series, and in parallel with three other helical heat exchangers arranged in series, and connected by inlet and outlet manifolds or tanks, according to the present invention.

FIGS. 7-10 and 13-15 depict embodiments of the present invention wherein a heat exchanger assembly comprises multiple helical heat exchangers combined into a larger assembly. FIGS. 7-10 depict one such embodiment of a heat exchanger assembly, wherein a plurality of helical heat exchangers are arranged in rows with manifolds or tanks on opposite ends of the assembly connected to the individual heat exchangers. As will be described in more detail below, the fluid flow paths may be arranged in counterflow and the heat exchangers may be arranged in parallel or in series, such that each flow path flows through more than one helical heat exchanger to create a substantially longer flow path, if connected in series, or a greater flow path area, if connected in parallel. FIG. 7 shows a heat exchanger assembly 1000 having three helical heat exchangers 10 on a lower level and another three helical heat exchangers 10 on an upper level, from which a variety of distinct fluid flow patterns may be obtained by proper baffling of the tank manifolds. As shown in FIG. 7, heat exchanger assembly 1000 includes a first manifold or tank 200 having a fluid inlet port 210 for passage of a first fluid 41 into the assembly and a fluid outlet port 510 for passage of a second fluid 51 out of the assembly. The assembly further includes a second manifold 400 having a fluid inlet port 410 (not shown) for passage of the second fluid 51 into the assembly and a fluid outlet port 310 (not shown) for passage of the first fluid 41 out of the assembly. The inlet and outlet manifolds are each sealed to prevent mixing of the first and second fluids 41, 51 inside the heat exchanger assembly.

Figure 8:
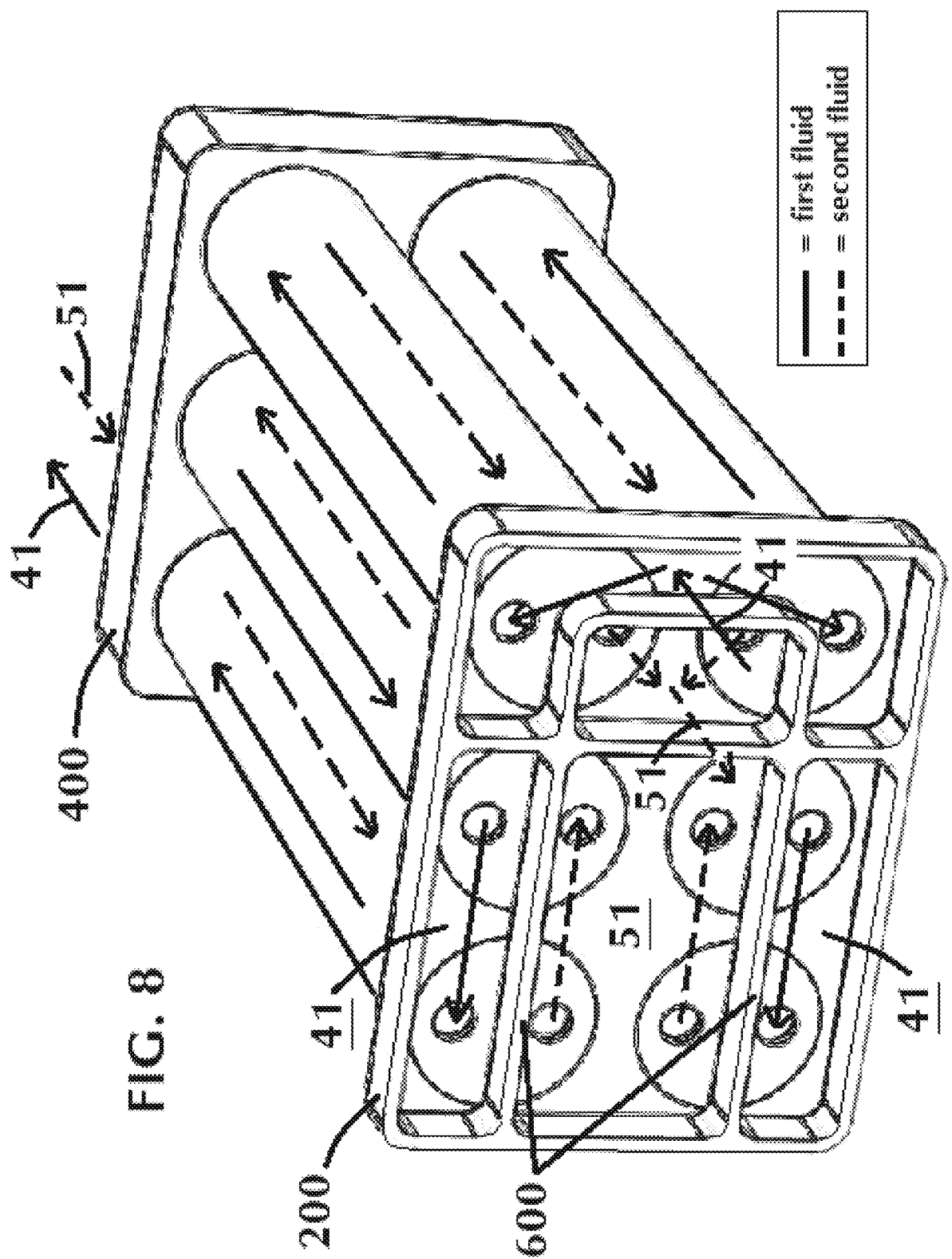
FIG. 8 depicts a partial cross-sectional view of the embodiment of the heat exchanger assembly shown in FIG. 7, taken along section A-A, showing baffling in the tanks to direct fluid flow within the heat exchanger assembly.

FIG. 8 depicts a partial cross-sectional view of manifold 200 of heat exchanger assembly 1000, taken along section A-A of FIG. 7. As shown in FIG. 8, heat exchanger assembly 1000 includes six heat exchanger tubes 10 arranged in two parallel rows each comprising three heat exchangers connected in series, and each heat exchanger tube includes a helical tube insert 100 secured therein. The tubes 10 are positioned such that the flow paths of the first and second fluids 41, 51 are arranged in counterflow, and such that each flow path flows through more than one helical heat exchanger as fluid flows between inlet 210 or 410 and outlet 310 or 510, respectively. A first end of each tube 10 is sealed within manifold or tank 200, which is sealed to prevent fluid mixing inside the assembly and includes baffling 600 to direct fluid flow as fluids 41, 51 flow through the assembly. On the opposing side of the assembly, a second end of each tube is sealed within manifold or tank 400, which is also sealed to prevent fluid mixing inside the assembly. Any suitable sealing material may be employed to seal the respective manifolds. The number of heat exchanger tubes arranged in one assembly is shown as six, for illustrative purposes only, as any assembly including two or more heat exchanger tubes arranged in series (or in parallel) to create flow paths of increased length (or greater flow path area) is intended to fall within the scope of the invention.

As shown in FIGS. 7-8, first fluid 41 enters the assembly through inlet 210 in tank 200, and second fluid 51 enters the assembly through inlet 410 in tank 400. Fluids 41, 51 flow in counterflow through the plurality of helical heat exchangers, and flow out of the assembly through outlets 310, 510 in the opposing tanks, respectively. In the assembly shown, the three lower helical heat exchangers are connected in series and are in parallel with the three upper helical heat exchangers, which are connected in series. As shown in FIG. 8, each pair of helical heat exchangers (when viewed along a vertical axis of the assembly) is arranged such that fluid flows between tanks 200, 400 in parallel through each heat exchanger. When the fluid reaches the opposing tank, baffling 600 directs the fluid within the tank such that the fluid continues to flow in series through the next pair of heat exchangers in the opposite direction. Baffling 600 further prevents mixing between fluids 41, 51 within the tank as the fluids enter the next pair of heat exchanger tubes. As shown in FIG. 8, fluids 41, 51 pass between tanks 200, 400 three times, in parallel through the upper and lower rows of heat exchangers, before exiting the heat exchanger assembly; however, it should be understood by those skilled in the art that in other embodiments, the assembly may include more or less than three pairs of heat exchangers.

Figure 9:
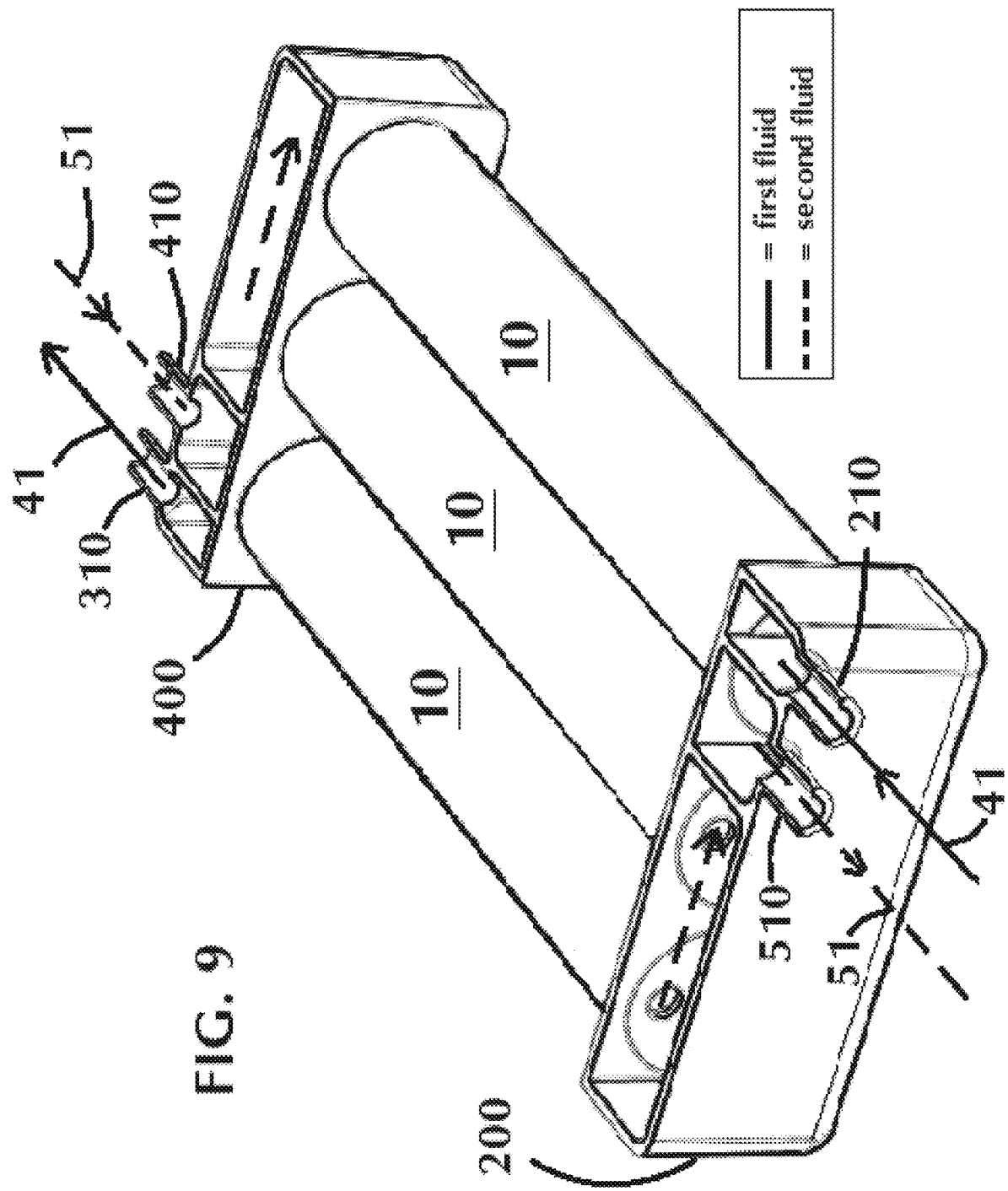
FIG. 9 depicts a cross-sectional view of the embodiment of the heat exchanger assembly shown in FIG. 7, taken along section B-B.

FIG. 9 depicts a cross-sectional view of heat exchanger assembly 1000, taken along section B-B of FIG. 7. As shown in FIG. 9, the first ends of the heat exchangers are connected by manifold 200 and the opposing ends are connected by manifold 400. In the embodiment shown, the manifolds are baffled to connect the heat exchanger tubes 10 for series flow of the fluids through the heat exchangers. First manifold 200 has a fluid inlet port 210 for passage of a first fluid 41 into the assembly and a fluid outlet port 510 for passage of a second fluid 51 out of the assembly, and second manifold 400 has an inlet port 410 for passage of the second fluid 51 into the assembly and an outlet port 310 for passage of the first fluid 41 out of the assembly. As shown in FIG. 9, inlet and outlet manifold fluid ports 210, 310, 410, 510 are arranged for counterflow operation; however it should be understood by those skilled in the art that, in other embodiments, the fluid ports may be arranged in parallel, or co-current, flow.

Figure 10:
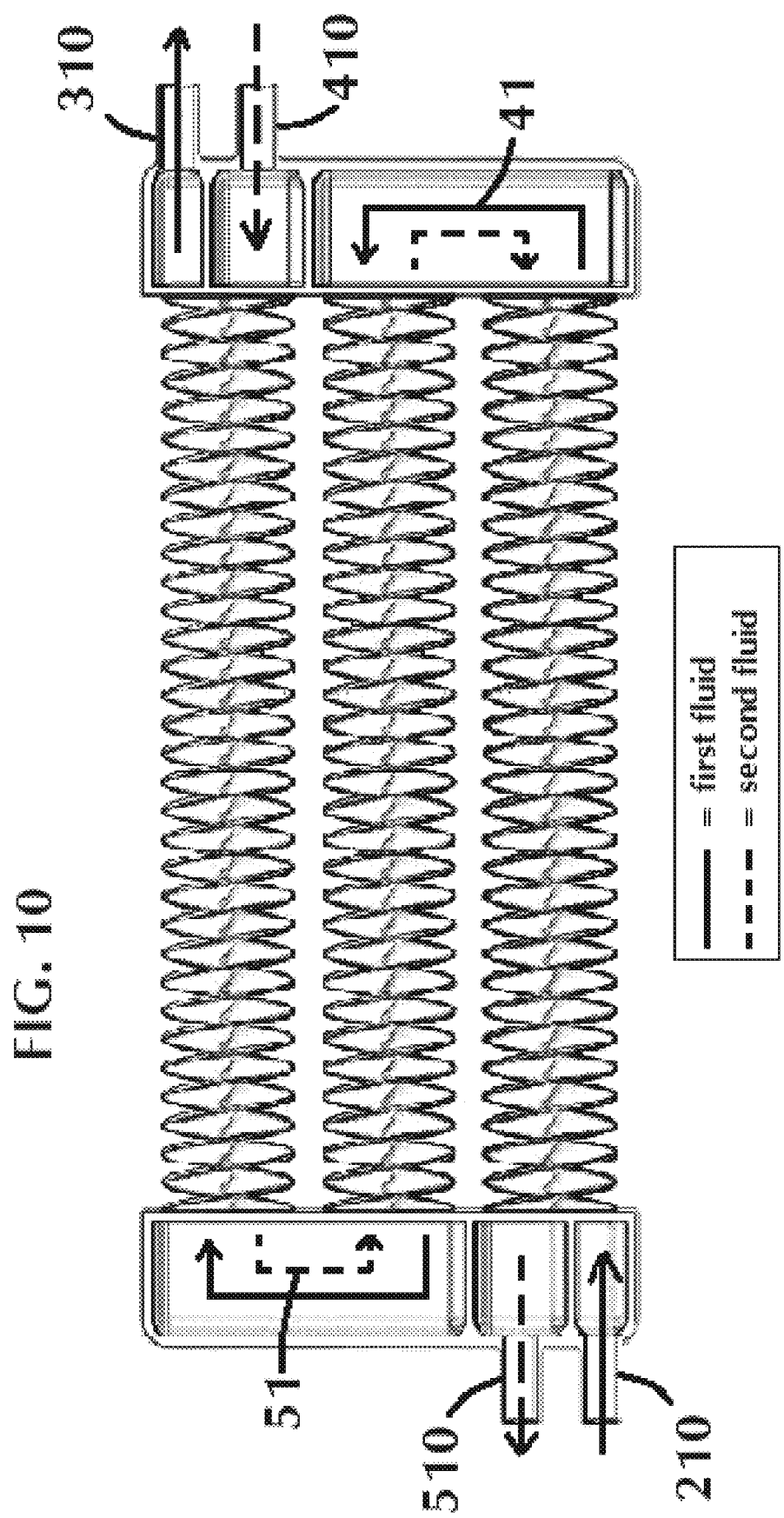
FIG. 10 depicts a top plan view of the heat exchanger assembly shown in FIG. 9, with the heat exchanges tubes removed to show the helical inserts.

FIG. 10 depicts a top plan view of the heat exchanger assembly shown in FIG. 9, with the heat exchanger tubes 10 removed to show the helical inserts. As described above, the respective sides of each helix are offset by a predetermined distance along the length of the helical insert 100, creating two distinct fluid flow paths 41, 51 between the helical convolutions. As shown in FIG. 10, first fluid flow path 41 begins at inlet 210 in tank 200 and ends at outlet 310 in tank 400, and is defined between a first side of the helix and the inner surface of the tube (not shown), while second fluid flow path 51 begins at inlet 410 in tank 400 and ends at outlet 510 in tank 200 and is defined between an opposing side of the helix and the inner surface of the tube. As shown in FIG. 8, the tanks may each include baffling to direct the fluid flow within the respective tanks or manifolds and prevent fluid mixing as fluid flows between the opposing tanks through each pair of helical heat exchangers.

The helical heat exchangers are shown in FIGS. 7-10 as being arranged such that the three lower heat exchangers are connected in series and in parallel with the three upper heat exchangers connected in series, for exemplary purposes only, and it should be understood by those skilled in the art that in other embodiments, the helical heat exchangers inside the enclosure could instead be connected to achieve many more combinations of flow patterns, per design requirements. For example, by changing the configuration of the baffling in the tanks, a heat exchanger assembly having three helical heat exchangers on a lower level and another three helical heat exchangers on an upper level, as shown in FIGS. 7-10, could instead have at least the following additional flow patterns: 1) all of the heat exchangers connected in parallel; 2) all of the heat exchangers connected in series; 3) the three lower heat exchangers connected in parallel and in series with the three upper heat exchangers connected in parallel; 4) the three lower heat exchangers connected in parallel and in series with the three upper heat exchangers connected in series; or 5) the three lower heat exchangers connected in parallel and in parallel with the three upper heat exchangers connected in series. Further distinct flow patterns are also possible.

Figure 11:
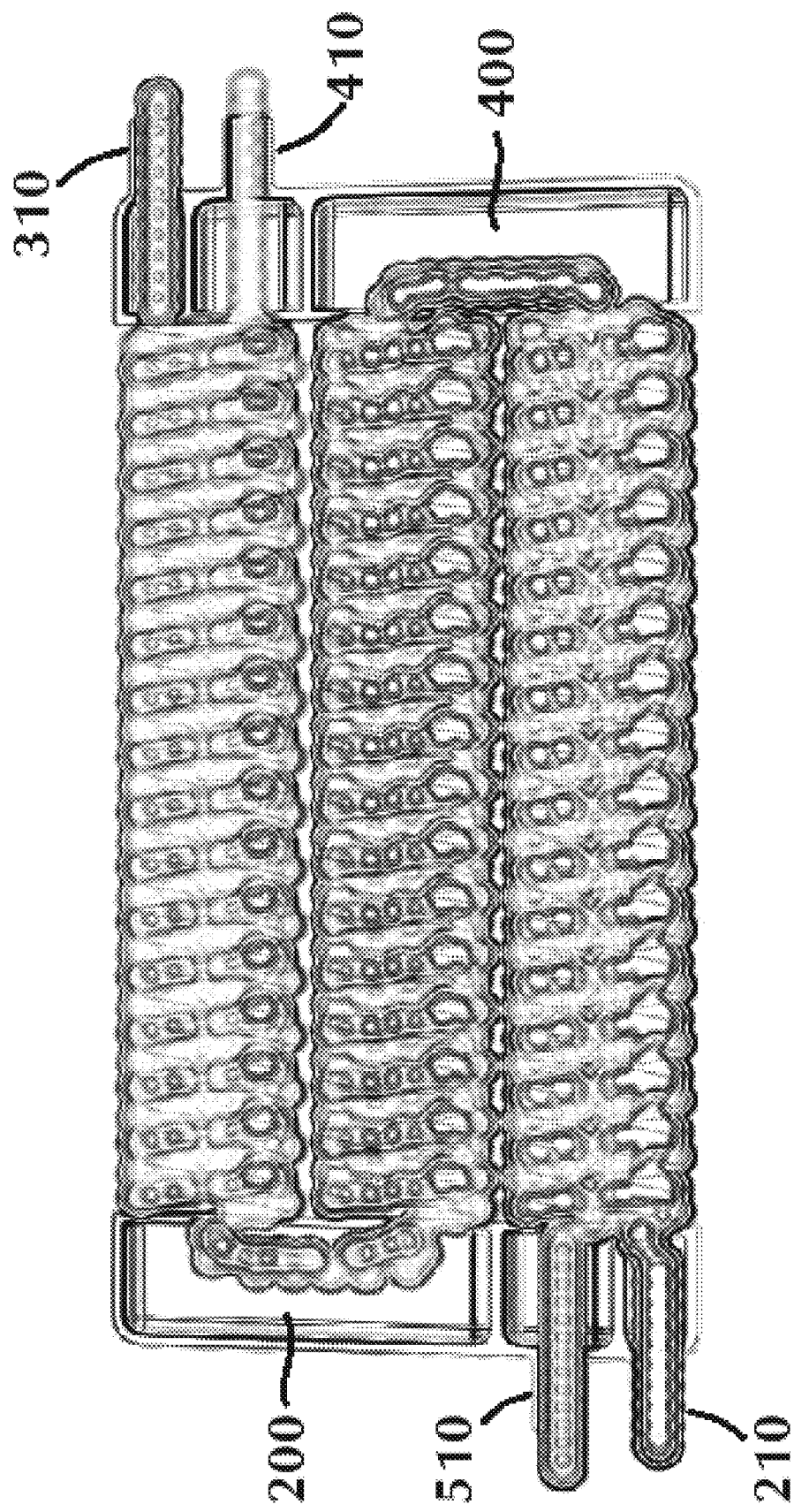
FIG. 11 shows the heat exchange process in pictorial form as fluid flows in counterflow through the heat exchanger assembly shown in FIG. 7.
Figure 12:
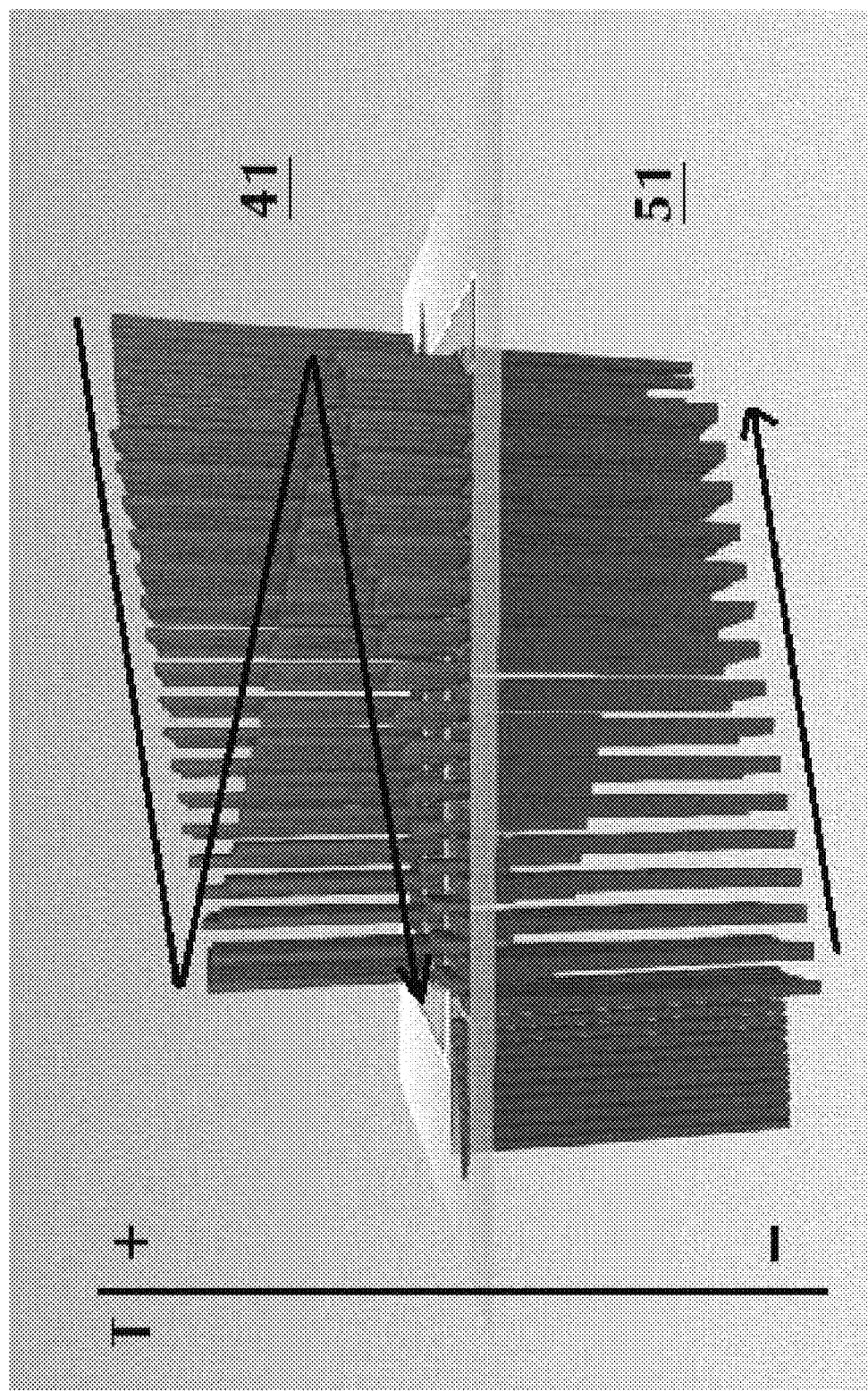
FIG. 12 depicts a chart showing the changing temperature of the respective fluids during the heat exchange process, as shown pictorially in FIG. 11.

FIGS. 11 and 12 depict an exemplary heat exchange process using the heat exchanger assembly shown in FIGS. 7-10, in pictorial and graphical form, respectively. Heated fluid 41 enters the assembly at inlet 210 in tank 200 and the flow path of fluid 41 is shown in FIG. 11 represented by a pattern of decreasing brightness level as the temperature of fluid 41 decreases during the heat exchange process. FIG. 12 shows a chart depicting the changing temperatures of fluids 41 and 51 as the fluids pass in counterflow three times between tanks 200 and 400. When viewed together, FIGS. 11 and 12 show that the temperature of a heated first fluid 41 becomes increasingly cooled as fluid 41 passes between tanks 200 and 400 through each of the pairs of helical heat exchangers, until an approximate equilibrium temperature between fluids 41, 51 is reached as fluid 41 exits the assembly at outlet 310 in tank 400. The uniform temperature difference between the two fluids minimizes the thermal stresses throughout the heat exchanger, as the outlet temperature of the "hot" fluid 51 approaches the inlet temperature of the "cold" fluid 51, and the more uniform temperature difference produces a more uniform rate of heat transfer throughout the heat exchanger, over the entire length of the fluid flow paths.

Figure 13:
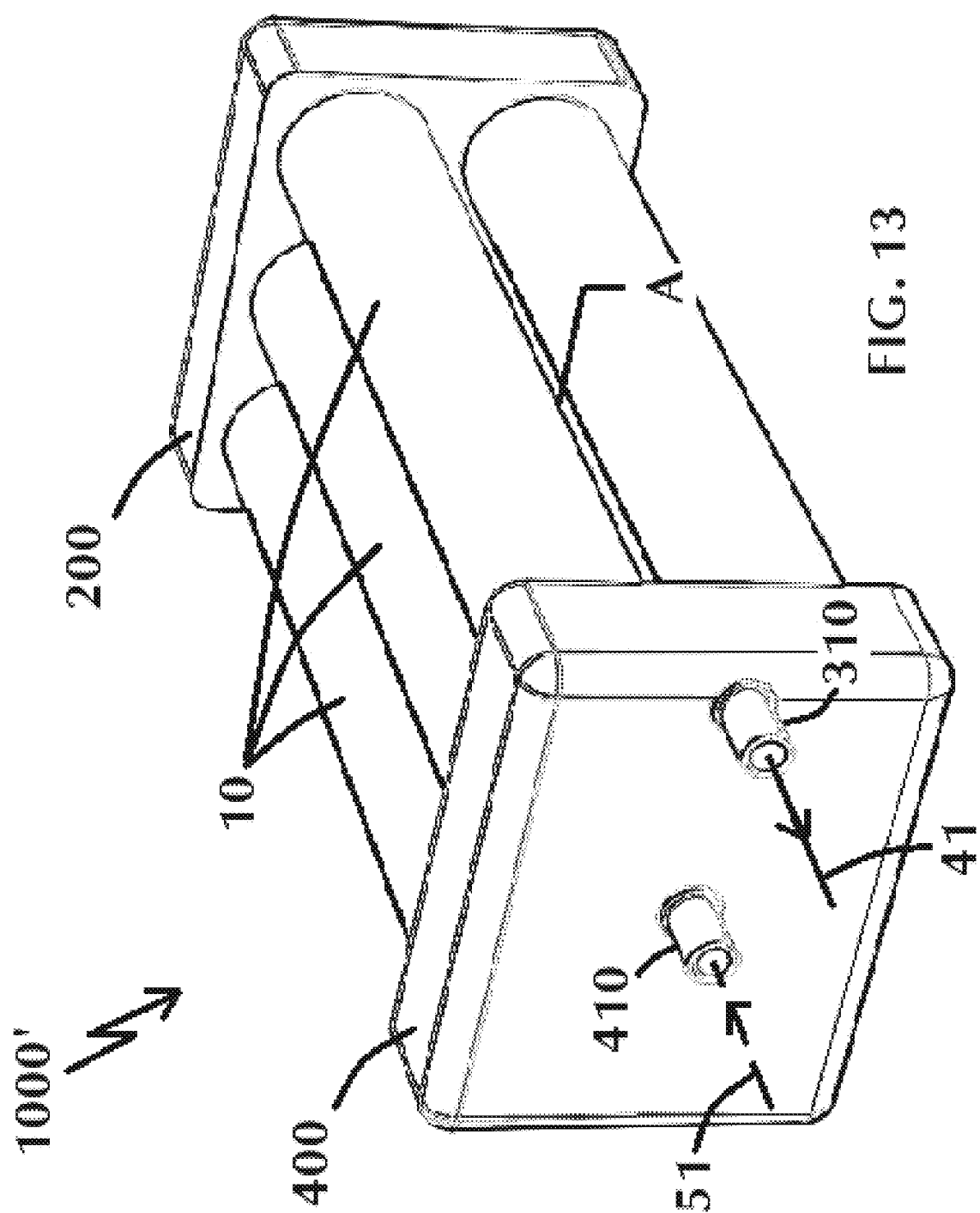
FIG. 13 depicts a perspective view of another embodiment of a heat exchanger assembly including multiple helical heat exchangers arranged in series and connected by inlet and outlet manifolds or tanks, according to the present invention.
Figure 14:
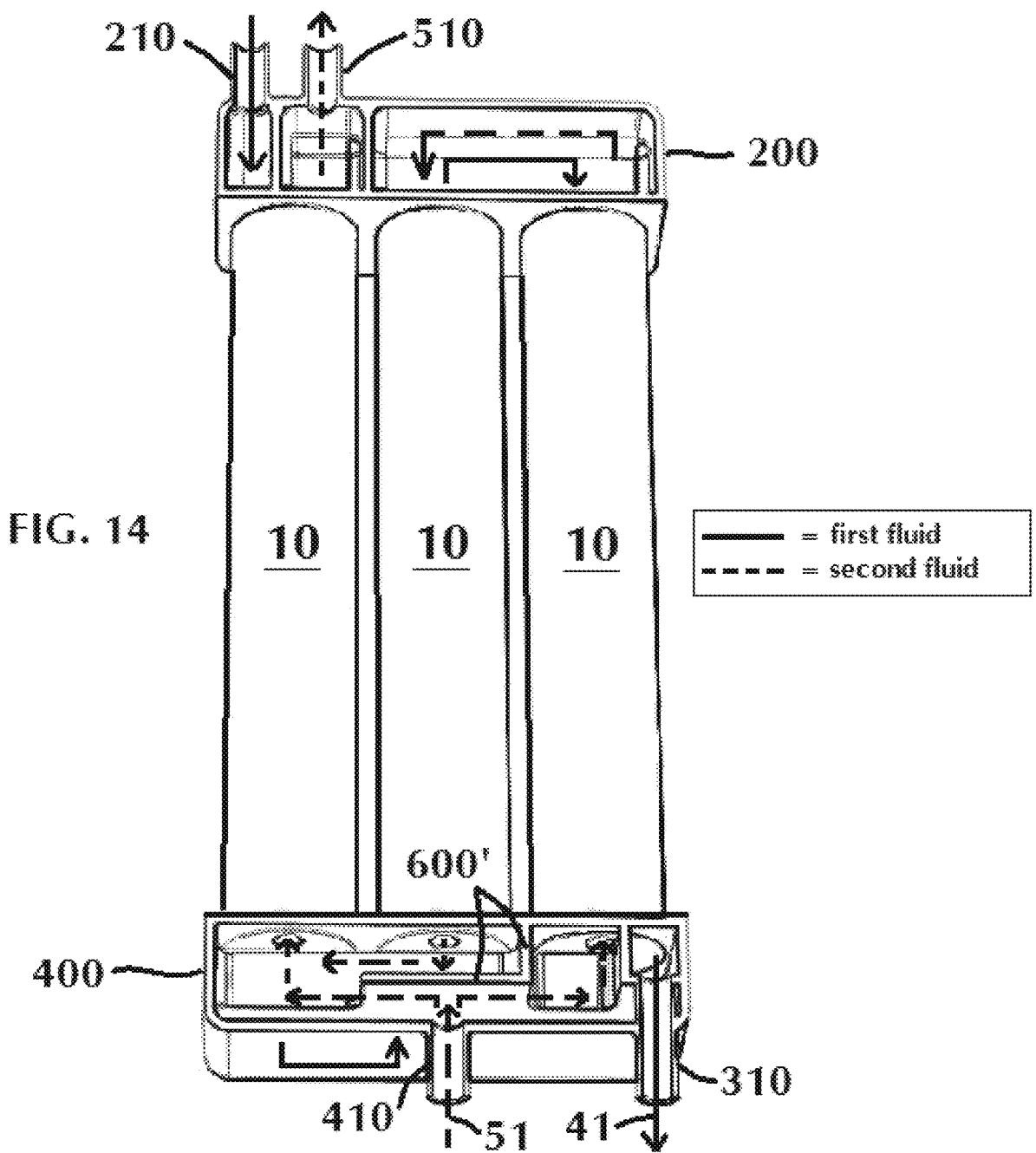
FIG. 14 depicts a cross-sectional view of the embodiment of the heat exchanger assembly shown in FIG. 13, taken along section A-A.
Figure 15:
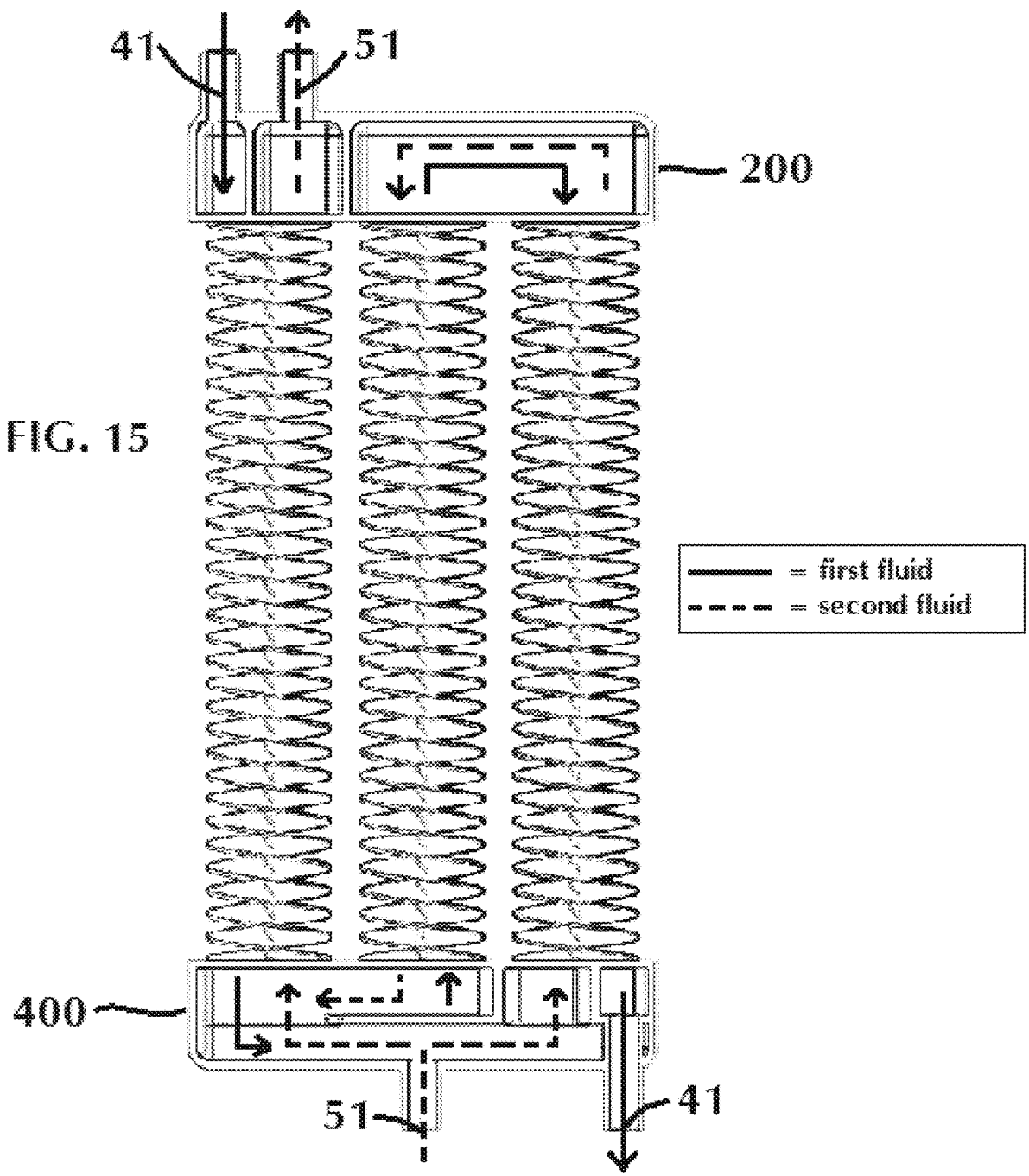
FIG. 15 depicts a top plan view of the heat exchanger assembly shown in FIG. 13, with the heat exchanger tubes removed to show the helical inserts and respective fluid flow paths.

FIGS. 13-15 depict another embodiment of a heat exchanger assembly comprising multiple helical heat exchangers arranged in series and combined into a larger assembly 1000'. As in the embodiment shown in FIG. 7, heat exchanger assembly 1000' includes six heat exchanger tubes 10 arranged in two parallel rows each comprising three heat exchangers; however as will be described below, baffling within the manifolds allows for a different flow path configuration. FIG. 14 shows the bottom portion of assembly 1000' as a cross-sectional view taken along section A-A of FIG. 13. As shown in FIG. 14, tank 400 includes baffling 600' having a different configuration than that of heat exchanger assembly 1000, as shown in FIGS. 7-10. Cold fluid 51 enters the assembly through inlet 410 in tank 400, and baffling 600' is configured to direct the fluid flow outwardly in the direction of the outermost heat exchanger tubes on each lateral side of the assembly, wherein fluid 51 then flows in parallel through the tubes in the direction of tank 200. As further shown in FIG. 14, the right-side flow path of fluid 51 (as viewed in FIG. 14) reaches tank 200 and is re-directed back through the middle heat exchanger tube by baffling within tank 200. The flow path combines within tank 400 with the original left-side flow path of fluid 51 and the combined fluid is re-directed again through the left-most heat exchanger tube and out of the assembly through outlet 510 in tank 200. Simultaneously, heated fluid 41 is flowing in counterflow through the assembly from inlet 210 to outlet 310 and is being cooled by fluid 51. As shown in FIG. 14, fluid 41 enters the assembly through inlet 210 in tank 200 and flows through the left-most heat exchanger tube before flowing through the remaining tubes in series and then out of the assembly through outlet 310 in tank 400.

FIG. 15 depicts a top plan view of the heat exchanger assembly shown in FIG. 14, with the heat exchanger tubes 10 removed to show the helical inserts 100. As shown in FIG. 15, each helical insert 100 comprises a single helix having a constant pitch along the length of the insert; however it should be understood by those skilled in the art that other configurations are also possible. In another embodiment, every helical insert may not have the same pitch, or in still another embodiment, one or more of the helical inserts may have a pitch that is varied along the length of the insert. A single helix heat exchanger tube insert, as in the present invention, provides for much greater flexibility in pitch length and heat exchanger chamber/channel design over that of prior art heat exchangers. For example, the twisting or winding flexibility allows for an increase in heat transfer surface area while optimizing hydraulic diameter and flow characteristics with low flow resistance. In that the pitch of the helix may be variable over the length of the fluid flow path, the present invention thus allows for more flexibility in spiral density for controlling fluid flow velocity and Reynold's Number, thereby increasing heat transfer performance over conventional heat exchangers. More specifically, primary heat transfer surface area can be added with little pressure drop as Reynold's Number is optimized through flexible chamber/channel design, as shown in the heat exchanger assemblies of FIGS. 7-10 and 13-15, respectively.

Thus the present invention achieves one or more of the following advantages. The present invention provides an improved heat exchanger assembly which includes a tube with helical tube insert sealed therein, thereby creating two fluid-tight fluid flow paths of considerably increased length within the tube. The heat exchanger provides a considerable increase in fluid flow path length, and consequently an increase in heat transfer, for a given tube length, and thus provides superior heat transfer performance over that of a typical liquid-to-liquid heat exchanger. The heat exchanger allows for counterflow operation, providing optimum heat transfer performance, and makes use of standard aluminum liquid-to-liquid heat exchanger manufacturing techniques, such as cab (controlled atmosphere brazing) furnace flux brazing.

While the present invention has been particularly described, in conjunction with specific embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A helical heat exchanger assembly, comprising:
a plurality of helical heat exchangers, each helical heat exchanger comprising a tube having first and second ends, a length, an inner diameter and a cross-section incorporating the inner diameter; a thermally conductive tube insert having a length and an outer diameter substantially equal to the inner diameter of the tube, the tube insert having first and second ends and comprising a single helix extending along the length of the tube insert and twisted around a central axis, the tube insert sealed within the tube by sealing an outer edge of the helix to an inner surface of the tube to form fluid-tight first and second fluid flow paths defined between opposing sides of the helix and the inner surface of the tube; and a plurality of inlet and outlet fluid ports for passage of a first and second fluid into and out of the tube;
a first manifold connecting each of the first ends of the helical heat exchanger tubes, the first manifold including a fluid inlet port for passage of the first fluid into the heat exchanger assembly; and
a second manifold connecting each of the second ends of the helical heat exchanger tubes, the second manifold including a fluid inlet port for passage of the second fluid into the heat exchanger assembly,
wherein the first and second manifolds are each sealed to prevent fluid mixing inside the heat exchanger assembly.

2. The heat exchanger assembly of claim 1 wherein at least two of the plurality of helical heat exchangers are arranged in parallel.

3. The heat exchanger assembly of claim 1 wherein at least two of the plurality of helical heat exchangers are arranged in series.

4. The heat exchanger assembly of claim 1 wherein at least one of the first or second manifolds includes baffles to direct fluid flow within the manifold.

5. The heat exchanger assembly of claim 1 wherein each helix has a predetermined pitch, the pitch of the helix defining a length of the first and second fluid flow paths within each helical heat exchanger.

6. The heat exchanger assembly of claim 5 wherein the pitch of each helix is constant along the length of the tube insert.

7. The heat exchanger assembly of claim 5 wherein the pitch of at least one of the helices is not constant along the length of the tube insert.

8. The heat exchanger assembly of claim 1 wherein the first manifold further comprises a fluid outlet port for passage of the second fluid out of the heat exchanger assembly and the second manifold further comprises a fluid outlet port for passage of the first fluid out of the heat exchanger assembly, and wherein the first and second manifold inlet and outlet fluid ports are arranged for counterflow operation.

9. The heat exchanger assembly of claim 1 wherein the first and second ends of each helix sealingly contact inner surfaces of the first and second tube ends, respectively, such that the first fluid flow path is defined between a first side of the helix and the inner surface of the tube, and the second fluid flow path is defined between a second side of the helix and the inner surface of the tube.

10. The heat exchanger assembly of claim 1 wherein each pair of tube and tube insert are comprised of braze-clad aluminum and are brazed together to create fluid-tight first and second fluid flow paths within the tube.

11. The heat exchanger assembly of claim 10 wherein the tube is mechanically swaged or compressed onto the outer edge of the helix prior to brazing.

12. A method of assembling a heat exchanger, comprising the steps of:
providing a plurality of helical heat exchangers, each helical heat exchanger comprising: a tube having first and second ends, a length, an inner diameter and a cross-section incorporating the inner diameter; a thermally conductive tube insert having a length and an outer diameter substantially equal to the inner diameter of the tube, the tube insert having first and second ends and comprising a single helix extending along the length of the tube insert and twisted around a central axis, the tube insert sealed within the tube by sealing an outer edge of the helix to an inner surface of the tube to form fluid-tight first and second fluid flow paths defined between opposing sides of the helix and the inner surface of the tube; and a plurality of inlet and outlet fluid ports for passage of a first and second fluid into and out of the tube;
providing first and second manifolds for attachment to opposing ends of the plurality of heat exchangers, at least one of the first or second manifolds comprising baffles to direct fluid flow within the manifold;

connecting each of the first ends of the helical heat exchanger tubes to the first manifold, the first manifold including a fluid inlet port for passage of the first fluid into the heat exchanger assembly;

connecting each of the second ends of the helical heat exchanger tubes to the second manifold, the second manifold including a fluid inlet port for passage of the second fluid into heat exchanger assembly; and sealing the first and second manifolds to the first and second ends of the heat exchanger tubes, respectively, to prevent fluid mixing inside the heat exchanger assembly.

13. The method of claim 12 further including the step of:
prior to connecting opposing ends of the plurality of heat exchangers to each of the first and second manifolds, respectively, arranging at least two of the plurality of helical heat exchangers in parallel via the baffles in one or both of the first and second manifolds.

14. The method of claim 12 further including the step of:
prior to connecting opposing ends of the plurality of heat exchangers to each of the first and second manifolds, respectively, arranging at least two of the plurality of helical heat exchangers in series via the baffles in one or both of the first and second manifolds.

15. The method of claim 12 wherein each helix has a predetermined pitch, the pitch of the helix defining a length of the first and second fluid flow paths within each helical heat exchanger.

16. The method of claim 15 wherein the pitch of each helix is constant along the length of the tube insert.

17. The method of claim 15 further including the step of:
varying the pitch of at least one helix along the length of the tube insert, wherein decreasing the pitch along at least a portion of the length of the tube insert increases the length of the first and second fluid flow paths within the helical heat exchanger, and wherein increasing the pitch along at least a portion of the length of the tube insert increases the flow path area of the first and second fluids within the helical heat exchanger.

18. The method of claim 12 wherein the first manifold further comprises a fluid outlet port for passage of the second fluid out of the heat exchanger assembly and the second manifold further comprises a fluid outlet port for passage of the first fluid out of the heat exchanger assembly, and wherein the first and second manifold inlet and outlet fluid ports are arranged for counterflow operation.

19. The method of claim 12 wherein sealing each tube insert within the tube to form the helical heat exchanger comprises:
sealing the first and second ends of the tube insert to inner surfaces of the first and second tube ends, respectively, such that the first fluid flow path is defined between a first side of the helix and the inner surface of the tube, and the second fluid flow path is defined between a second side of the helix and the inner surface of the tube.

20. The method of claim 12 wherein each pair of tube and tube insert are comprised of braze-clad aluminum, and further including the step of:
brazing each helical heat exchanger in a controlled atmosphere brazing furnace to create fluid-tight first and second fluid flow paths within each tube.

21. The method of claim 20 further including mechanically swaging or compressing the tube onto the outer edge of the helix prior to brazing the heat exchanger.

22. A method of operating a heat exchanger assembly, comprising:
providing a plurality of helical heat exchangers, each helical heat exchanger comprising: a tube having first and second ends, a length, an inner diameter and a cross-section incorporating the inner diameter; a thermally conductive tube insert having a length and an outer diameter substantially equal to the inner diameter of the tube, the tube insert having first and second ends and comprising a single helix extending along the length of the tube insert and twisted around a central axis, the tube insert sealed within the tube by sealing an outer edge of the helix to an inner surface of the tube to form fluid-tight first and second fluid flow paths defined between opposing sides of the helix and the inner surface of the tube; and a plurality of inlet and outlet fluid ports for passage of a first and second fluid into and out of the tube;

providing first and second manifolds for attachment to opposing ends of the plurality of heat exchangers, at least one of the first or second manifolds comprising baffles to direct fluid flow within the manifold;

connecting each of the first ends of the helical heat exchanger tubes to the first manifold, the first manifold including a fluid inlet port for passage of the first fluid into the heat exchanger assembly and a fluid outlet port for passage of the second fluid out of the heat exchanger assembly;

connecting each of the second ends of the helical heat exchanger tubes to the second manifold, the second manifold including a fluid inlet port for passage of the second fluid into heat exchanger assembly and a fluid outlet port for passage of the first fluid out of the heat exchanger assembly;

sealing the first and second manifolds to the first and second ends of the heat exchanger tubes, respectively, to prevent fluid mixing inside the heat exchanger assembly;

connecting inlet and outlet fluid lines for the first fluid to the first fluid inlet and outlet ports of the first and second manifolds, respectively;

connecting inlet and outlet fluid lines for the second fluid to the second fluid inlet and outlet ports of first and second manifolds, respectively; and flowing the first and second fluids through the heat exchanger assembly to transfer heat from one fluid to the other.

23. The method of claim 22 wherein the first and second manifold inlet and outlet fluid ports are arranged for counterflow operation.

24. The method of claim 22 wherein at least two of the plurality of helical heat exchangers are arranged in parallel via the baffles in one or both of the first and second manifolds.

25. The method of claim 22 wherein at least two of the plurality of helical heat exchangers are arranged in series via the baffles in one or both of the first and second manifolds.

26. The method of claim 22 wherein each helix has a predetermined pitch defining a length of the first and second fluid flow paths within each helical heat exchanger, and further including the step of:
varying the pitch of at least one helix along the length of the tube insert, wherein decreasing the pitch along at least a portion of the length of the tube insert increases the length of the first and second fluid flow paths within the helical heat exchanger, and wherein increasing the pitch along at least a portion of the length of the tube insert increases the flow path area of the first and second fluids within the helical heat exchanger.

* * * * *